United States Patent [19]

Kirkham

[11] Patent Number: 5,538,373
[45] Date of Patent: Jul. 23, 1996

[54] MACHINE TOOL VIBRATION ISOLATION SYSTEM

[75] Inventor: Edward E. Kirkham, Brookfield, Wis.

[73] Assignee: Giddings & Lewis, Inc., Fond du Lac, Wis.

[21] Appl. No.: 300,136

[22] Filed: Sep. 2, 1994

Related U.S. Application Data

[63] Continuation-in-part of Ser. No. 835,949, Feb. 20, 1992, Pat. No. 5,354,158.

[51] Int. Cl.$^6$ .............................. B23C 1/06; B25J 11/00
[52] U.S. Cl. ..................... 409/131; 248/562; 248/631; 248/654; 408/234; 409/145; 409/201; 409/216; 409/235; 901/22; 901/23
[58] Field of Search ..................... 409/145, 164, 409/80, 131, 132, 201, 204, 212, 216, 183, 235; 29/36, 39, 40; 408/129, 130, 234, 236; 219/121 L, 121 LC; 414/735; 74/479, 83.15; 248/631, 654, 562; 83/177

[56] References Cited

U.S. PATENT DOCUMENTS

| | | |
|---|---|---|
| Re. 27,051 | 2/1971 | Cappel . |
| 2,823,591 | 2/1958 | Craddock et al. . |
| 3,037,286 | 6/1962 | Bower . |
| 3,577,659 | 5/1971 | Kail . |
| 3,592,422 | 7/1971 | Norman ..................... 248/18 |
| 3,596,153 | 7/1971 | Brainard et al. . |
| 3,683,747 | 8/1972 | Pettit . |
| 3,803,379 | 4/1974 | McRay ..................... 219/121 L |
| 4,236,607 | 12/1980 | Halwes et al. ..................... 248/562 X |
| 4,280,285 | 7/1981 | Haas . |
| 4,343,610 | 8/1982 | Chou . |
| 4,360,182 | 11/1982 | Titus . |
| 4,364,540 | 12/1982 | Montabet . |
| 4,407,625 | 10/1983 | Shum . |
| 4,501,949 | 2/1985 | Antol et al. ..................... 219/121 LC |
| 4,512,695 | 4/1985 | Brun et al. . |
| 4,536,690 | 8/1985 | Belsterling et al. . |
| 4,556,957 | 12/1985 | Ichikawa . |
| 4,569,627 | 2/1986 | Simunovic . |

(List continued on next page.)

FOREIGN PATENT DOCUMENTS

| | | |
|---|---|---|
| 109201 | 5/1984 | European Pat. Off. . |
| 202206 | 11/1986 | European Pat. Off. . |
| 69.35394 | 7/1971 | France . |
| 2540984 | 3/1977 | Germany . |
| 8301746 | 12/1987 | Germany . |
| 558788 | 2/1976 | U.S.S.R. . |
| 1049244 | 10/1983 | U.S.S.R. . |
| 1194672 | 11/1985 | U.S.S.R. . |
| 1224137 | 4/1986 | U.S.S.R. . |
| 1222538 | 4/1986 | U.S.S.R. . |
| 1296401 | 3/1987 | U.S.S.R. . |
| 2083795 | 3/1982 | United Kingdom . |
| 2173472 | 10/1986 | United Kingdom . |
| 2179605 | 3/1987 | United Kingdom . |
| WO9103145 | 3/1991 | WIPO . |

OTHER PUBLICATIONS

"Milling With Universal Spindles", American Machinist, Jun., 1989.

"A Platform With Six Degrees of Freedom", D. Stewart, The Institute of Mechanical Engineers, Proceedings 1956–66, pp. 371–394.

"Universal Tyre Test Machine", V. E. Gough & S. G. Whiteall Proceedings, Ninth International Technical Congress F.I.S.I.T.A., May 1962, pp. 117–137.

Primary Examiner—William Briggs
Attorney, Agent, or Firm—Foley & Lardner

[57] ABSTRACT

A machine tool isolation system is disclosed. The preferred system includes a pair of platforms connected by a plurality of legs. A tool is typically connected to one platform, and a workpiece to the other. The legs are able to move one platform with respect to the other which can create vibrations. A base, typically formed by a plurality of legs, is mounted to one of the platforms to support the two platforms and legs connected therebetween. A vibration isolator is disposed between the base legs and the floor or other support on which the entire system is mounted.

21 Claims, 16 Drawing Sheets

U.S. PATENT DOCUMENTS

| | | |
|---|---|---|
| 4,576,577 | 3/1986 | Lam et al. . |
| 4,578,763 | 3/1986 | Jones et al. . |
| 4,621,926 | 11/1986 | Merry et al. . |
| 4,645,084 | 2/1987 | Deike . |
| 4,651,589 | 3/1987 | Lambert . |
| 4,686,877 | 8/1987 | Jaritz et al. ............................... 83/177 |
| 4,723,460 | 2/1988 | Rosheim . |
| 4,753,596 | 6/1988 | Hart et al. . |
| 4,776,749 | 10/1988 | Wazenbergt et al. . |
| 4,806,068 | 2/1989 | Kohli et al. . |
| 4,819,469 | 4/1989 | Shelef . |
| 4,872,291 | 10/1989 | Lindsey ............................... 408/234 X |
| 4,988,244 | 1/1991 | Sheldon et al. . |
| 5,028,180 | 7/1991 | Sheldon et al. . |
| 5,259,710 | 11/1993 | Charles ............................... 409/235 |
| 5,354,158 | 10/1994 | Sheldon ............................... 409/201 |
| 5,392,663 | 2/1995 | Charles ............................... 74/83.15 |
| 5,401,128 | 3/1995 | Lindem et al. ............................... 409/201 X |

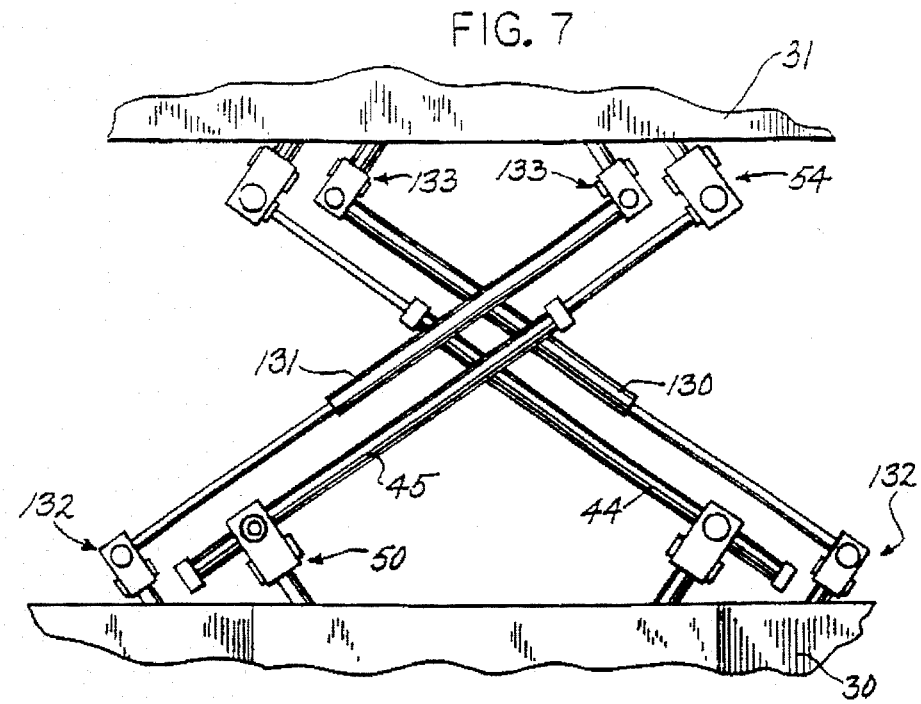
FIG. 7
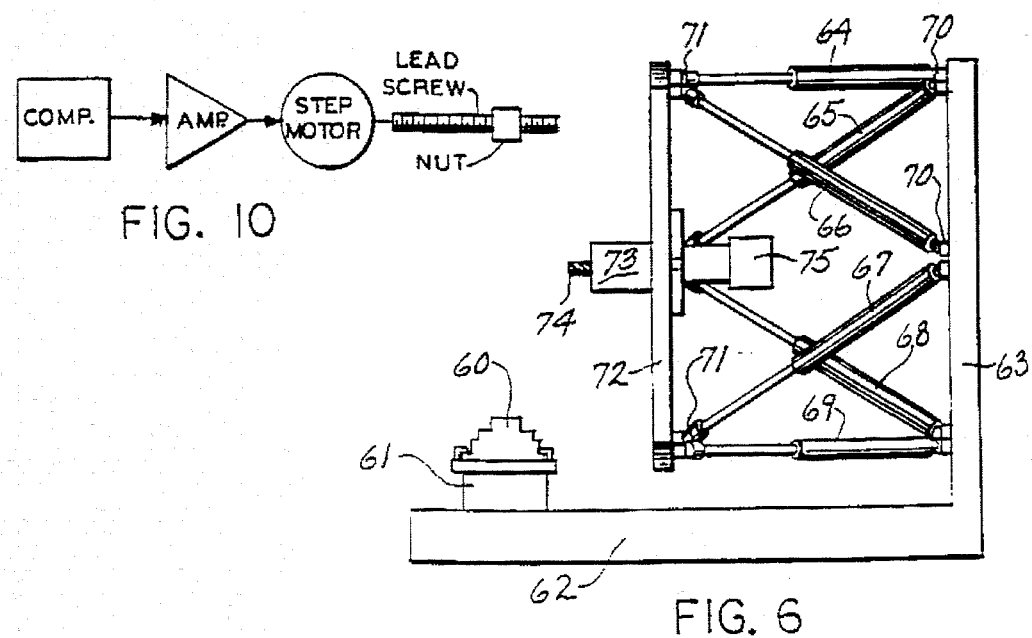
FIG. 10
FIG. 6

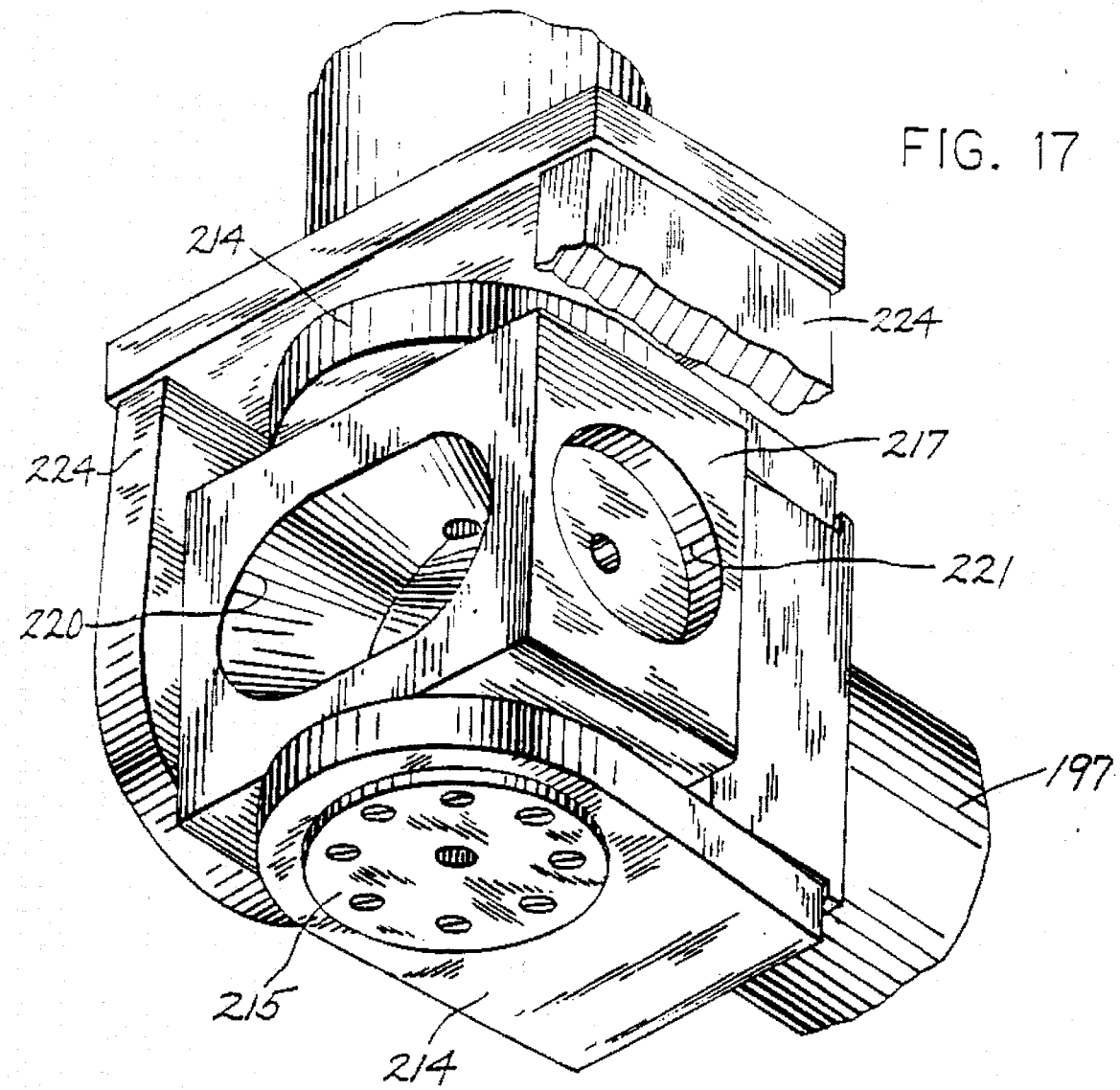

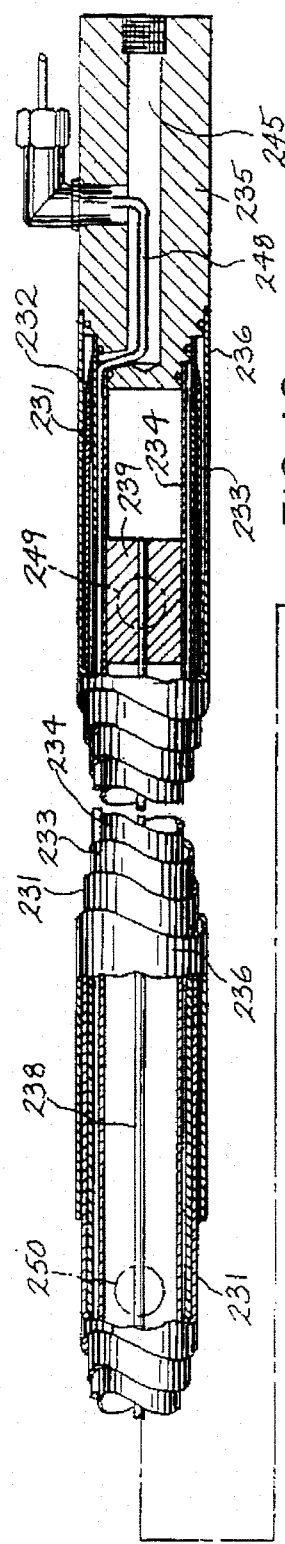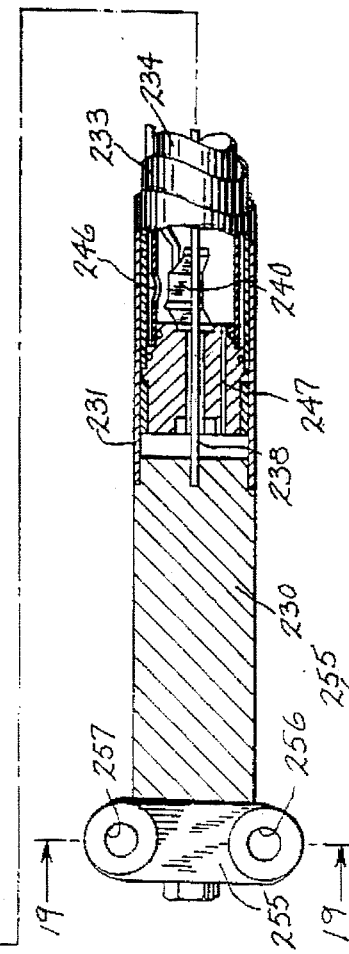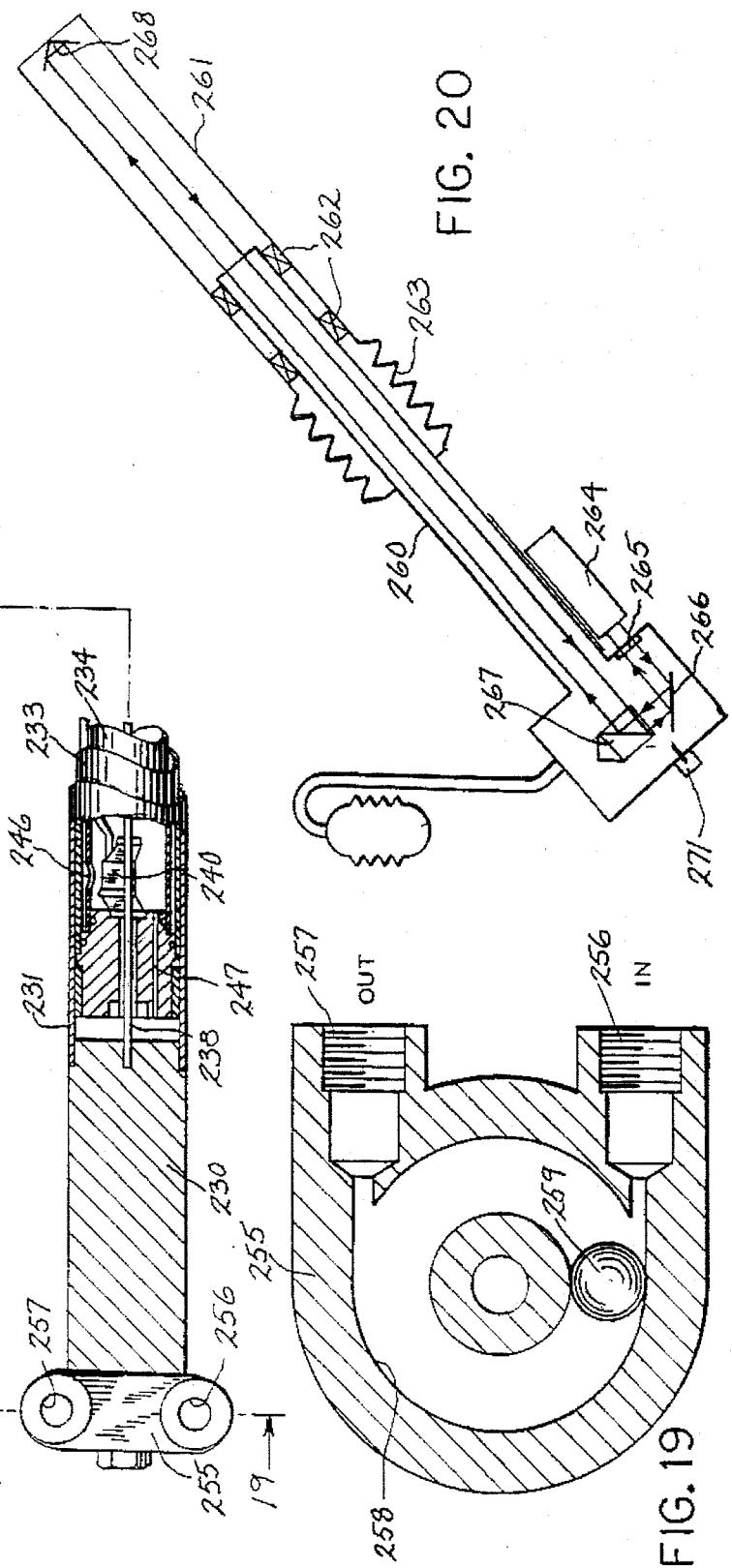
FIG. 18
FIG. 19
FIG. 20

MACHINE TOOL VIBRATION ISOLATION SYSTEM

BACKGROUND OF THE INVENTION

This is a continuation-in-part of the prior application having Ser. No. 07/835,949 filed on Feb. 20, 1992, now U.S. Pat. No. 5,354,158. The invention relates to a machine for locating an operator with respect to an object, and more particularly to a versatile machine tool in which the tool is connected to a vibration isolation device that separates the machine tool from a support structure such as a floor.

The most versatile form of cutting tool type machine tool presently in use is the so-called machining center which typically can accomplish milling, drilling, boring and tapping operations in up to five axes of movement, the three linear orthagonal axes and two rotational directions. Since its introduction over thirty years ago, the machining center's basic components have not changed. They typically include a bed, an upright column and a spindle head carried by the column. A rotary table for holding a workpiece is typically mounted on the bed and provides one of the rotary directions of motion. The column and table move relative to each other for one of the linear directions of motion, the spindle head and table move relative to each other in a vertical direction of a second linear axis of motion, and the spindle head and workpiece move horizontally with respect to each other for the third linear direction of motion. The fifth axis is provided by rotating the spindle head or the work table in a vertical plane relative to each other.

A sixth axis of rotary motion is available in the present machining centers by controlling the angular position of the spindle. The present machining centers may have either a horizontal spindle or a vertical spindle and they typically are controlled by computer numerical control. The machining centers usually have mechanisms for automatically changing tools from and to a magazine of tools associated with the machining center, and will often have automatic workpiece handling as well.

To achieve the full six axes of motions in a present machining center requires that the movements of the table, column, spindle head, spindle, and bed be coordinated and that these sometimes massive components be moved in very controllable finite increments. Because all of these components are being moved, many times simultaneously under computer numerical control, accuracy requires a rigidity to the components and an accurate path through which the components can be moved. This has resulted in the development of more rigid and massive components such as for the bed and column and very expensive and finely formed ways along which the components can travel relative to each other in the linear directions.

Although the modern machining center provides very accurate machining, the machining center becomes very complex and expensive when it is designed to provide the maximum versatility of being able to machine any point on the exposed five surfaces of the typical cubic workpiece.

Modern machining centers are typically rigidly attached to a support structure such as a floor to prevent shifting of the machine tool components and to maintain accuracy. However, the rigid attachment combined with the movement and working of the machine tool components can lead to deleterious vibration. This vibration detrimentally affects the ability of the machine tool to provide smooth surface finishes on the object being machined and also limits the ability of the machine tool to rapidly accelerate the operator with respect to the object (.e.g, the spindle head with respect to the workpiece).

Attempts have been made to isolate machine tools from external vibrations traveling through the floor by placing vibration damping pads beneath the machine tools. However, these machine tools must still be bolted or otherwise solidly attached to the supporting floor which limits the damping ability. This approach also fails to mitigate the vibrations established by the moving components of the machine tool and the interaction of the operator and the object.

Raising the natural frequency of a conventional machine tool can eliminate some of the detrimental vibrations that occur under normal operating conditions. However, the necessary rigid attachment to a support structure limits the machine tool designer's ability to raise the machine tool's natural frequency. Additionally, most conventional machine tools have a structure that includes a massive base, to provide rigidity and stability, and less massive moving components. This difference in masses also limits the machine tool designer's ability to raise the machine's natural frequency and to lessen the undesirable vibrational effects.

It would be advantageous to design a machine tool having a base platform and a movable platform isolated from the supporting floor where the platforms had more desirable mass ratios.

SUMMARY OF THE INVENTION

The present invention relates generally to a machine tool isolation system in which a machine tool cooperates with a vibration isolation component. The isolation component is configured to be mounted between a floor or other support structure and the machine tool to raise the natural frequency of the machine tool. The isolation system comprises a base platform configured to receive and hold a workpiece. The base platform may include a plurality of base legs extending downwardly towards the floor.

A tool platform is configured to receive and hold a tool. An actuator mechanism, such as a plurality of extensible legs, is connected between the base platform and the tool platform to selectively move the tool platform with respect to the base platform. Furthermore, a vibration isolation component is disposed between the base legs and the floor to help isolate the machine tool from its support structure. If the machine tool is designed without the plurality of base legs, the vibration isolation component can be mounted between the base platform and the floor.

According to additional aspects of the invention, the vibration isolation component includes a spring and a damper. The spring and damper can be combined in a single material, such as a composite rubber pad.

According to additional aspects of the invention, the base platform and the tool platform are designed to have a ratio of masses ranging from approximately 0.5 to 2.0. Most preferably, the platforms are of approximately equal mass.

The invention also relates generally to a method for raising the natural frequency of a machine tool supported on a support structure and also for raising the possible relative acceleration of one machine tool platform with respect to the other machine tool platform. The machine tool in this method is of the type configured to rigidly hold a workpiece relative to one of the platforms and to hold a tool with respect to the other platform. The platforms are connected by an actuator mechanism capable of moving the platforms with respect to each other.

The method comprises the steps of forming a pair of platforms for supporting the workpiece and the tool, respectively; sizing the pair of platforms so the ratio of platform masses is in the range from 0.5 to 2.0; and separating the pair of platforms from the support structure by a vibration isolation component.

BRIEF DESCRIPTION OF THE DRAWINGS

FIG. 6 is a view in elevation of a third embodiment of a machine tool assembly for use with the machine tool isolation system in accordance with the invention;

FIG. 7 is a partial view in elevation of a leg and instrument arm arrangement usable with any of the embodiments;

FIG. 10 is a schematic diagram of a third embodiment of a control;

FIG. 17 is a view in perspective of the yoke assembly of FIGS. 15 and 16;

FIG. 18 is a foreshortened view in longitudinal cross-section of an instrument arm usable with the machine tools;

FIG. 19 is a view in section of one end of the instrument arm of FIG. 18 and taken in the plane 19—19 in FIG. 18;

FIG. 20 is a schematic view of an instrument arm using a laser interferometer for measuring distances;

DETAILED DESCRIPTION OF THE PREFERRED EMBODIMENTS

Figure 2:
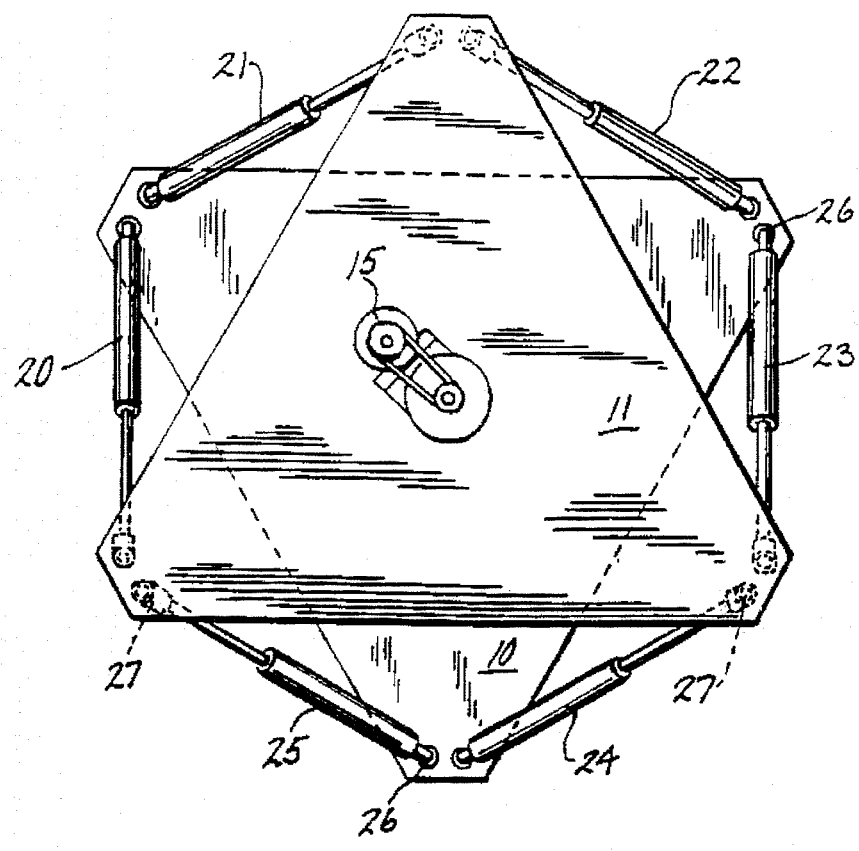
FIG. 2 is a top plan view of the machine tool of FIG. 1.
Figure 1:
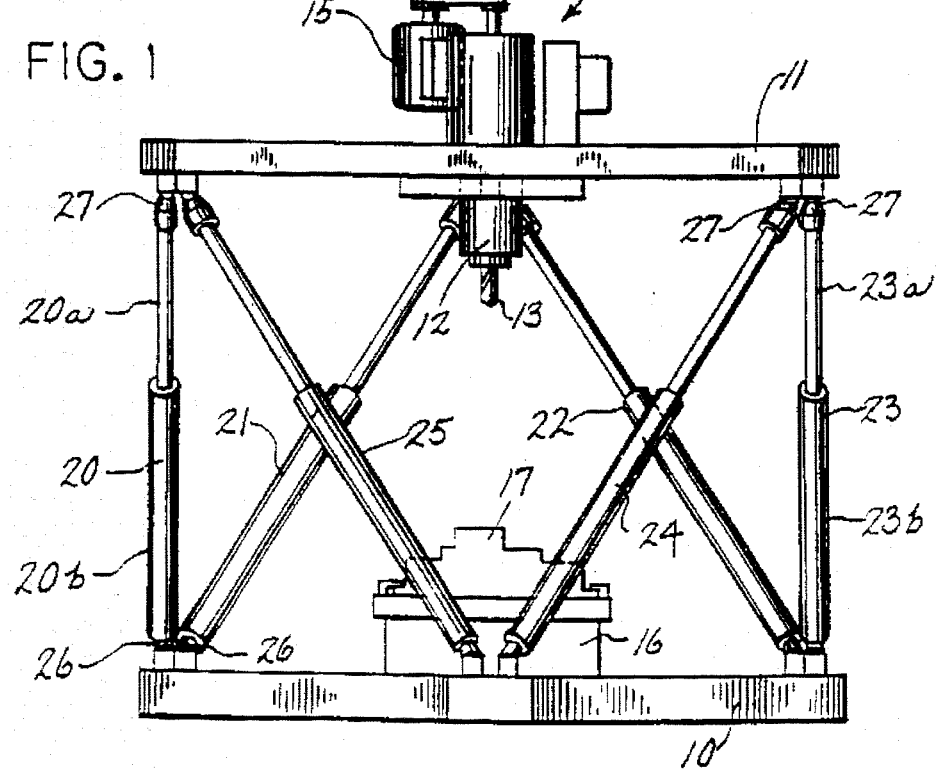
FIG. 1 is a view in elevation of a machine tool assembly for use with the machine tool isolation system in accordance with the invention.

Referring to FIGS. 1 and 2, the machine tool of the first embodiment has a base 10 in the nature of a support or platform and a spindle support or platform 11 spaced from the base 10. A spindle head 12 is mounted on the spindle platform 11 and is adapted to receive a rotating cutting tool 13. A spindle drive assembly indicated generally by the numeral 14 is mounted on the spindle platform 11 and the drive includes a motor 15 connected by a power train to the spindle head 12 in a usual manner. The base platform 10 carries a workpiece support 16 which in turn receives a workpiece represented by the part 17.

The spaced platforms 10 and 11 are joined together by six powered and extensible legs 20–25. Each of the legs is pivotally mounted at its lower extremity to the base platform 10 by a ball and socket joint 26. Similarly, each of the upper ends of the legs 20–25 is pivotally attached to the spindle platform 11 by a second ball and socket joint 27.

The legs 20–25 may be formed of telescoping upper and lower parts 20a and 20b, for example. The telescoping parts may be the piston rod 20a and cylinder 20b of a hydraulic cylinder. The length of such legs can be adjusted by controlling the volume of hydraulic fluid in each end of each cylinder.

The position of the spindle support 11 relative to the base support 10 and therefore the position of the cutting tool 13 relative to the workpiece 17 can be adjusted by simultaneously manipulating the length of each of the six legs 20–25. Within an envelope of motion the cutting tool 13 can be applied against all five exposed surfaces of a cubic type workpiece. The only constraints to the envelope of motion relative to the five exposed surfaces are the spread of the joints 26 on the base support 10 and the spread of the second joints 27 on the spindle support 11, the minimum and maximum length of the legs 20–25, the total range of linear motion of each of the legs, and the need to avoid placing certain legs in a common plane for purposes of stability. Within the envelope of motion, this construction allows the machining of contours in three dimensions as well as straight line point-to-point machining.

The simultaneous manipulation of the length of each of the legs 20–25 can achieve motion in all six axes. That is, motion in a linear direction along each of the three orthogonal axes and rotary motion about each of those three axes.

In the embodiment of FIGS. 1 and 2, the six legs may be considered to be arranged in three pairs. That is, the legs 20 and 21 constitute a pair, the legs 22 and 23 constitute a second pair, and the legs 24 and 25 constitute a third pair. It should be noted that the legs of each pair are arranged so that they are at an angle with respect to each other. The joints 26 of the pair of legs 20 and 21 are close to each other. The joints 27 of adjacent legs 20 and 25, for example, are also close to each other. The effect is that the lower joints 26 generally define a triangle and the upper joints 27 also generally define a triangle. These two triangles and the six legs generally define edges of an octahedron. As shown in FIGS. 1 and 2, the area of the base platform 10 circumscribed by the lower ball joints 26 and the area of the spindle support 11 circumscribed by the upper ball joints 27 are substantially the same. This is advantageous for several reasons. First, such an arrangement maximizes the structural stiffness of the machine. Secondly, the footprint of the machine is minimized for a particular cubic size of workpiece to be handled. Also, a greater envelope of surface area for the workpiece can be accommodated before certain legs and supports are positioned in a common plane thereby creating a potentially ambiguous position.

Figure 3:
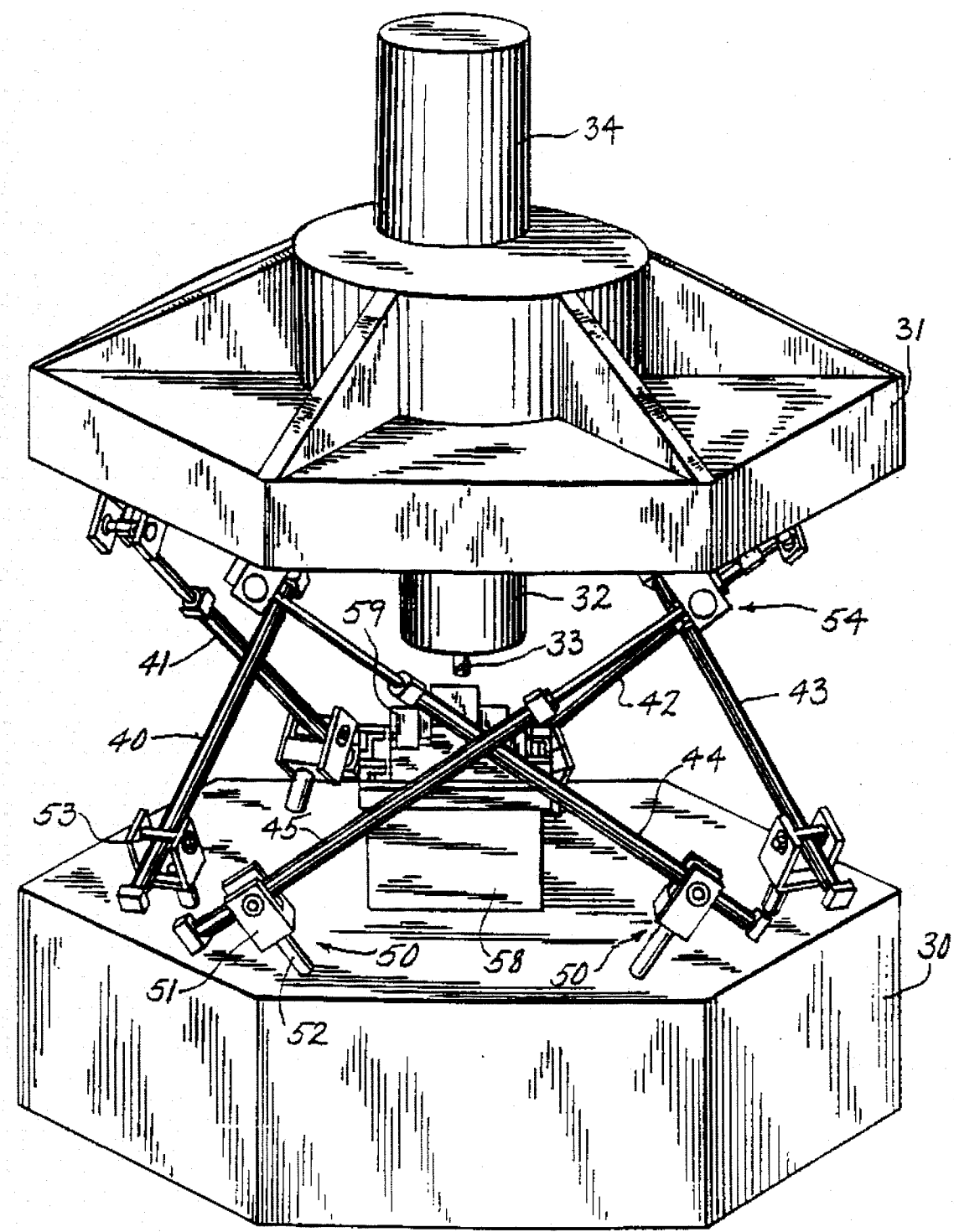
FIG. 3 is a view in perspective of a second embodiment of a machine tool assembly for use with the machine tool isolation system in accordance with the present invention.
Figure 4:
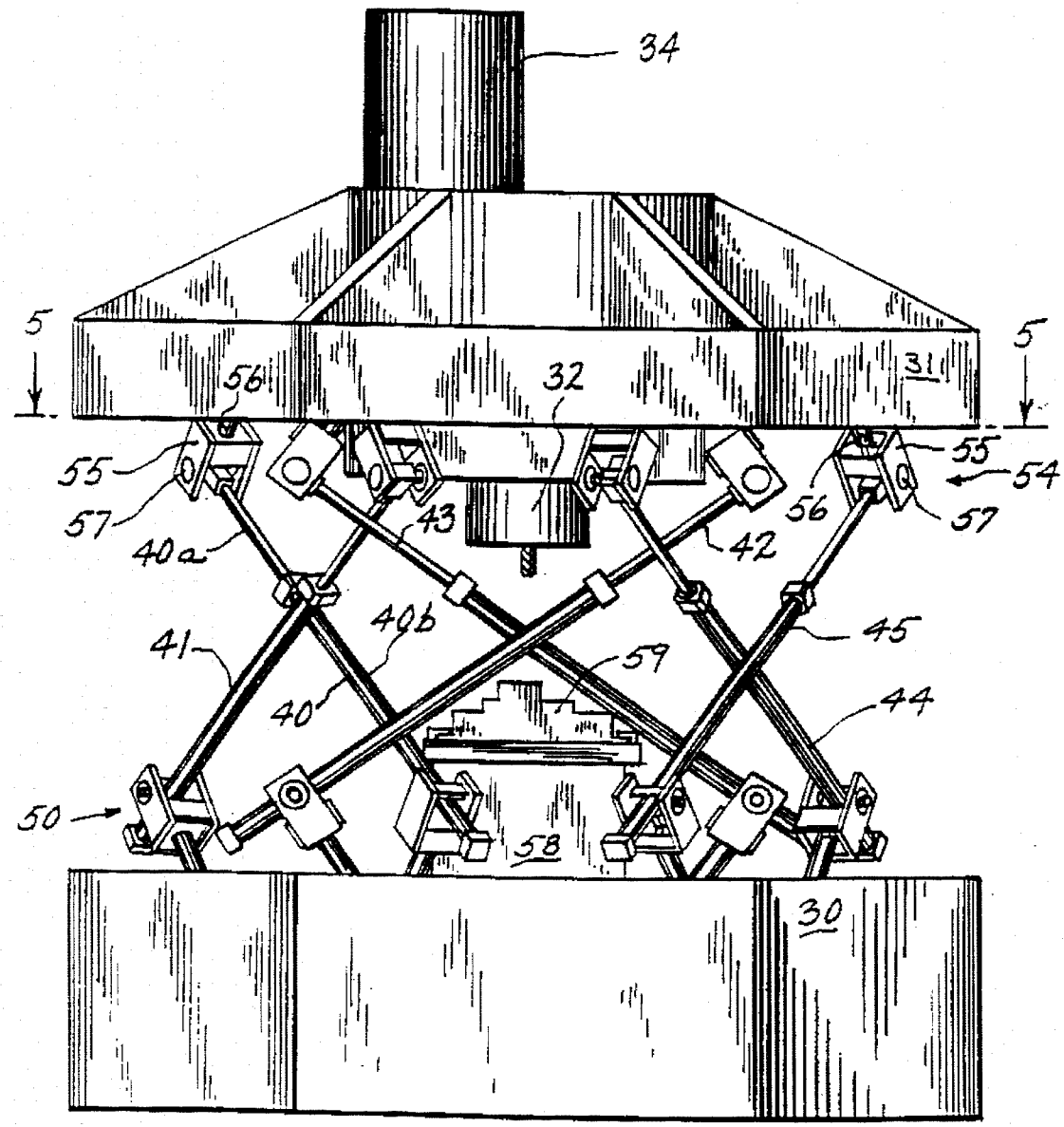
FIG. 4 is a view in elevation of the machine tool of FIG. 3.
Figure 5:
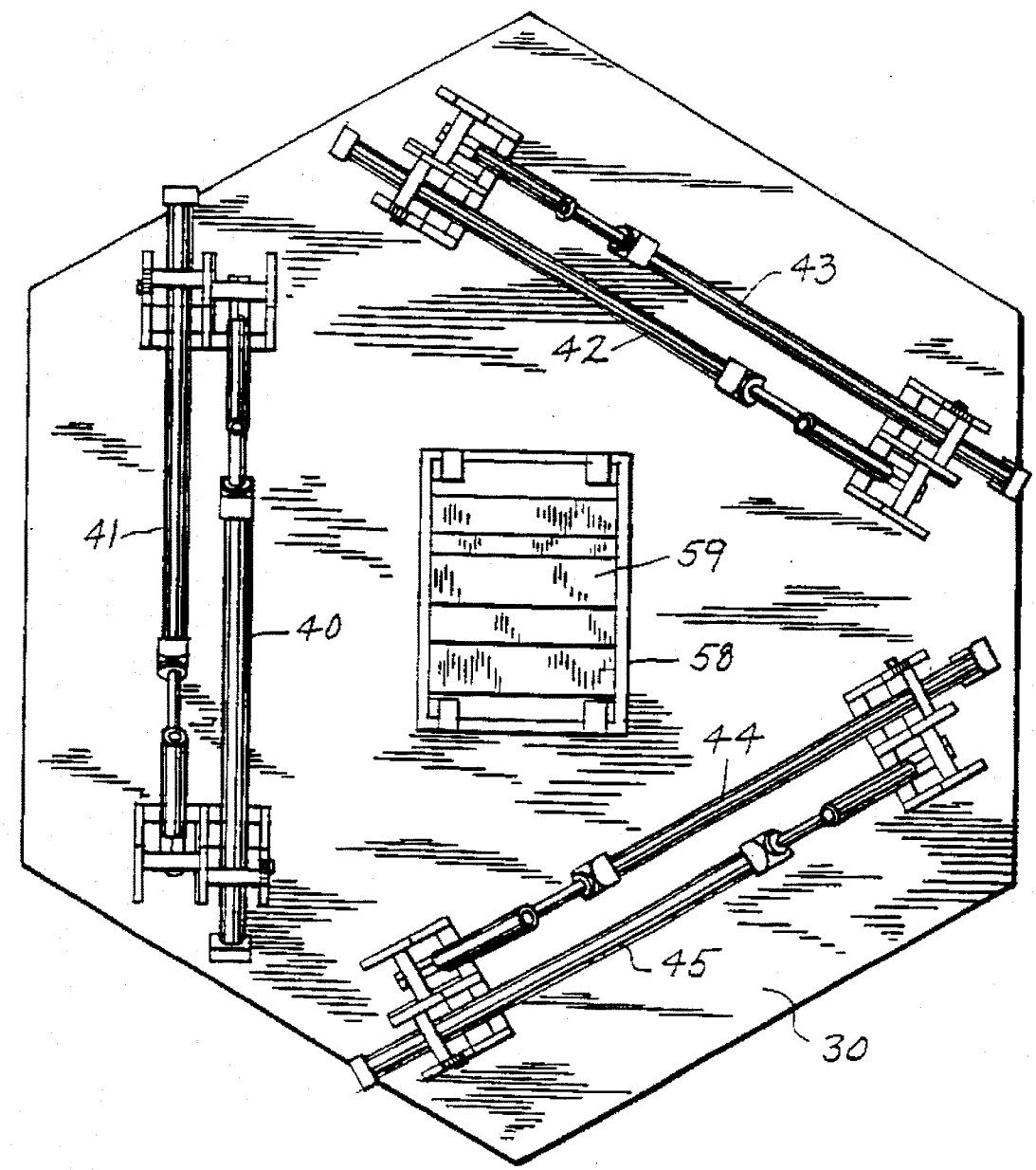
FIG. 5 is a top view of the machine tool of FIGS. 3 and 4 as viewed through the section of the plane 5—5 of FIG. 4.

Referring to FIGS. 3–5, the second embodiment includes a base support or platform 30, a spindle support 31 which mounts a spindle head 32 adapted to receive a cutting tool 33. The spindle head is rotated by a spindle drive 34. The base support 30 and spindle support 31 are connected by six extensible legs 40–45. The legs are arranged in three pairs such as the pair 40 and 41 and legs of each pair cross each other so that they are again mounted at an angle with respect to each other. The legs 40–45 are also formed of telescoping upper and lower elements 40a and 40b, for example.

The legs 40–45 are joined to the base support 30 at a first point near their lower end by a joint indicated generally by the numeral 50. The joint 50 includes a clevis 51 mounted for rotation about the axis of a shaft 52 that projects from the base support 30. A typical trunnion 53 engages the lower element 40b–45b of each leg and is rotatably mounted in a clevis 51. It will thus be seen that a joint 50 provides two degrees of freedom of movement.

The upper telescoping portions 40a–45a of the legs are similarly joined to the spindle support 31 at second points along the length of the legs by joints 54. The joints 54 likewise consist of a clevis 55 rotatably mounted on a shaft 56 extending downwardly form the underside of the spindle support 31 and a trunnion 57 which supports the upper leg portions 40a et seq. in the clevis 55. As can be seen in FIG. 5 in particular, the joints 50 and 54 and their attachments to the supports 30 and 31 define the corners of a six-sided polygon in each of the two supports. As is apparent from FIGS. 3–5, the area of the base support 30 that is circumscribed by the connections of six lower joints 50 with the base support 30 is substantially the same as the area of the spindle support 31 that is circumscribed by the connections of the six upper joints 54 with the spindle support 31.

The shafts 52 and 56 of the joints 50 and 54 can be mounted in their respective supports to project in any direction. The ball joints of the first embodiment could also be used in this second embodiment, and the trunnion joints of this second embodiment could be used in the first.

The base support 30 mounts a workpiece support 58 which holds a workpiece exemplified by the part 59.

The legs 40–45 may also be formed as hydraulic cylinders with the piston rod defining the upper end 40a et seq. and the cylinder portion forming the lower ends 40b et seq. Because the piston rod can rotate within the cylinder, the two degrees of motion afforded at each of the joints 50 and 54 are sufficient. If the upper and lower portions of the actuators forming the legs cannot be allowed to twist, and actuator other than a hydraulic cylinder is used to accomplish the extension, and a third degree of rotational motion will be required in one or the other of the upper and lower joints 50 and 54. In the leg of FIGS. 14–17, an additional degree of motion is required in the joints or compensation must be provided for the linear inaccuracy resulting from relative rotation of the telescoping parts introduced by slight angular displacement of the yoke assemblies relative to each other. Instead of using hydraulic cylinders as the actuators for the legs, any means for achieving linear motion can be used such as forming the upper portion of each leg as a lead screw and mounting a rotating nut in the lower portion of the leg or vice versa. Alternatives are linear motors, recirculating ball screw drives, chair drives, and so forth.

In the third embodiment of FIG. 6, neither the tool nor the workpiece is located within the envelope defined by the leg structure. The workpiece 60 is mounted on a workpiece support 61 which in turn is mounted on a base 62 that is attached to an upright 63. The six legs 64–69 are connected at one end to the upright 63 by trunnion joints 70 in a manner similar to that of the second embodiment. The opposite ends of the legs 64–69 are connected by trunnion joints 71 to the spindle support 72. The spindle support carries a spindle 73 adapted to mount a tool 74 and the spindle 73 is driven by a spindle drive 75. The tool 74 projects away from the envelope defined by the legs 64–69. The third embodiment is otherwise the same as the first embodiment.

In the third embodiment, the workpiece support 61 may be mounted on ways supported by the base 62 so that the workpiece support 61 with the workpiece 60 may move relative to the tool 74. Even though the workpiece 60 is not mounted on the upright 63, the workpiece location relative to the upright support 63 can be fixed, or at least known, at any instant in time.

Other arrangements of spindle and workpiece can also be employed, such as mounting the workpiece above the spindle or mounting an upright 63 as in the third embodiment of FIG. 6 on ways so that it can travel along the length of a workpiece.

Figure 8:
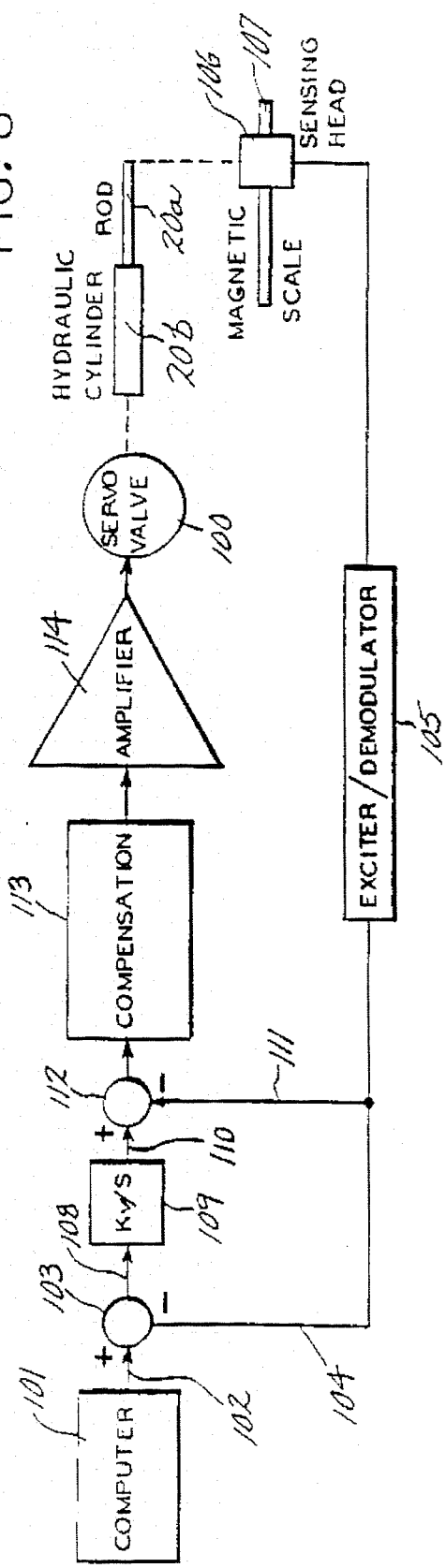
FIG. 8 is a schematic view of a control for a machine tool.
Figure 9:
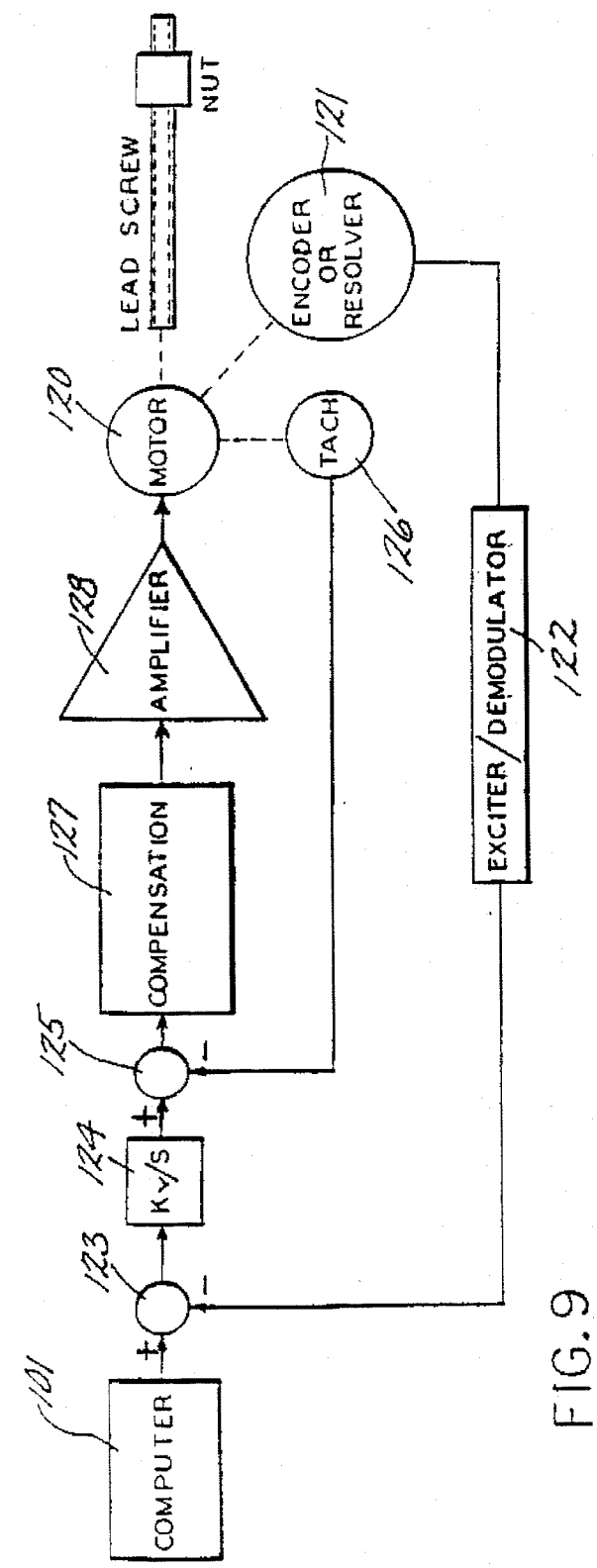
FIG. 9 is a schematic diagram of a second embodiment of a control.

The legs must be moved in a coordinated manner in order to position the supports or platforms relative to each other. The coordinated movement is preferably accomplished by a computer control which provides a position signal for each leg to achieve a desired position for the spindle platform relative to the base platform and therefore for the cutting tool relative to the workpiece. Suitable control schemes are illustrated in FIGS. 8 and 9. In FIG. 8, the leg in the form of a hydraulic cylinder such as the legs 20–25 are controlled by a servo valve 100 which controls the volume of hydraulic fluid in the cylinder on each side of the piston and therefore the position of the piston rod within the cylinder. A computer 101 produces an output position command in the line 102. That position command is compared in a summing circuit 103 with a feedback position signal in a line 104 leading from an exciter/demodulator 105 that receives the signal from a sensing head 106 traveling along a magnetic scale 107. The sensing head 106 is coupled to the piston rod 20a et seq. so that changes in position of the piston rod will be reflected in changes in position of the sensing head 106 along the magnetic scale 107 which is at a known position, either fixed or varying, with respect to the hydraulic cylinder 20b et seq. The summing circuit 103 produces a position error signal in a line 108 which inputs to an integration network 109, the output of which is a velocity command in a line 110. The velocity command is compared with a velocity feedback signal in a line 111 leading from the exciter/demodulator 105 and the two signals are fed to a summing circuit 112 which produces an output signal representative of a velocity error. This velocity error signal is fed to a compensation network 113 where phase shift compensation takes place, and the resulting compensated signal is fed to an amplifier 114 which in turn controls the servo valve 100.

A similar control loop leading from the computer would be provided for each of the six legs 20–25 and the computer

101 would generate an output position command for the desired position of each of the six legs to achieve a particular finite position of the cutting tool relative to the workpiece.

The control arrangement of FIG. 9 is similar to that of FIG. 8 but is shown in relation to a motor 120 rotating a lead screw and nut arrangement. An encoder or resolver 121 is connected to the motor 120 to provide a position feedback signal through the exciter/demodulator 122, and that position signal is compared at a summing junction 123 with the position command from the computer 61 to produce a position error signal fed to the integration network 124 which outputs a velocity command compared at a summing junction 125 with the velocity position signal from a tachometer 126 connected to the motor 120. A compensation network 127 functions to produce an appropriate signal to an amplifier 128 connected to the motor drive. Once again, there would be a similar loop for each of the six legs of the machine.

The control schemes of FIGS. 8 and 9 employ closed loop control. However, by using a stepping motor it is not necessary to have a closed loop control. An example of a control system using a stepping motor is shown in FIG. 10.

Position signals can be provided by sensors that are directly connected to each of the legs or to the actuators for the legs. However, a more accurate approach uses separate instrument arms. Such an arrangement is shown in FIG. 7.

In FIG. 7, a six legged machine tool of the embodiment shown in FIGS. 3–6 has separate instrument arms 130 and 131 associated with respective powered legs 44 and 45, respectively. The instrument arms 130 and 131 are each linearly extensible and are connected at their lower ends to the base platform 30 by trunnion joints 132 and at their upper ends to the spindle platform 31 by trunnion joints 133. The trunnion joints 132 and 133 are the same in structure and operation as the joints 50 and 54 used to connect power legs 44 and 45 to the platforms 30 and 31.

The instrument arms 130 and 131 are used solely for the purpose of sensing the relative positions of the platforms. The instrument arms can include a sensing head traveling along a magnetic scale to provide the desired feedback signal as to length and therefore as to position. Other forms of instrument arms can also be used. The advantage in using the separate instrument arms is that the load deflections that will occur in the power legs and their joints will not be translated into errors in the position of the cutting tool. The instrument arms being smaller and lighter and carrying no weight other than their own, are not subject to the same forces and deflections to which the powered legs are subject.

Although the instrument arms 130 and 131 are shown mounted parallel with respective power legs, it is not necessary for the instrument arms to be so mounted. Instrument arms are not required to be associated with any particular power leg. It is, however, necessary to have at least six instrument arms to provide an unambiguous set for signals for the positions of the supports or platforms relative to each other.

Figure 11:
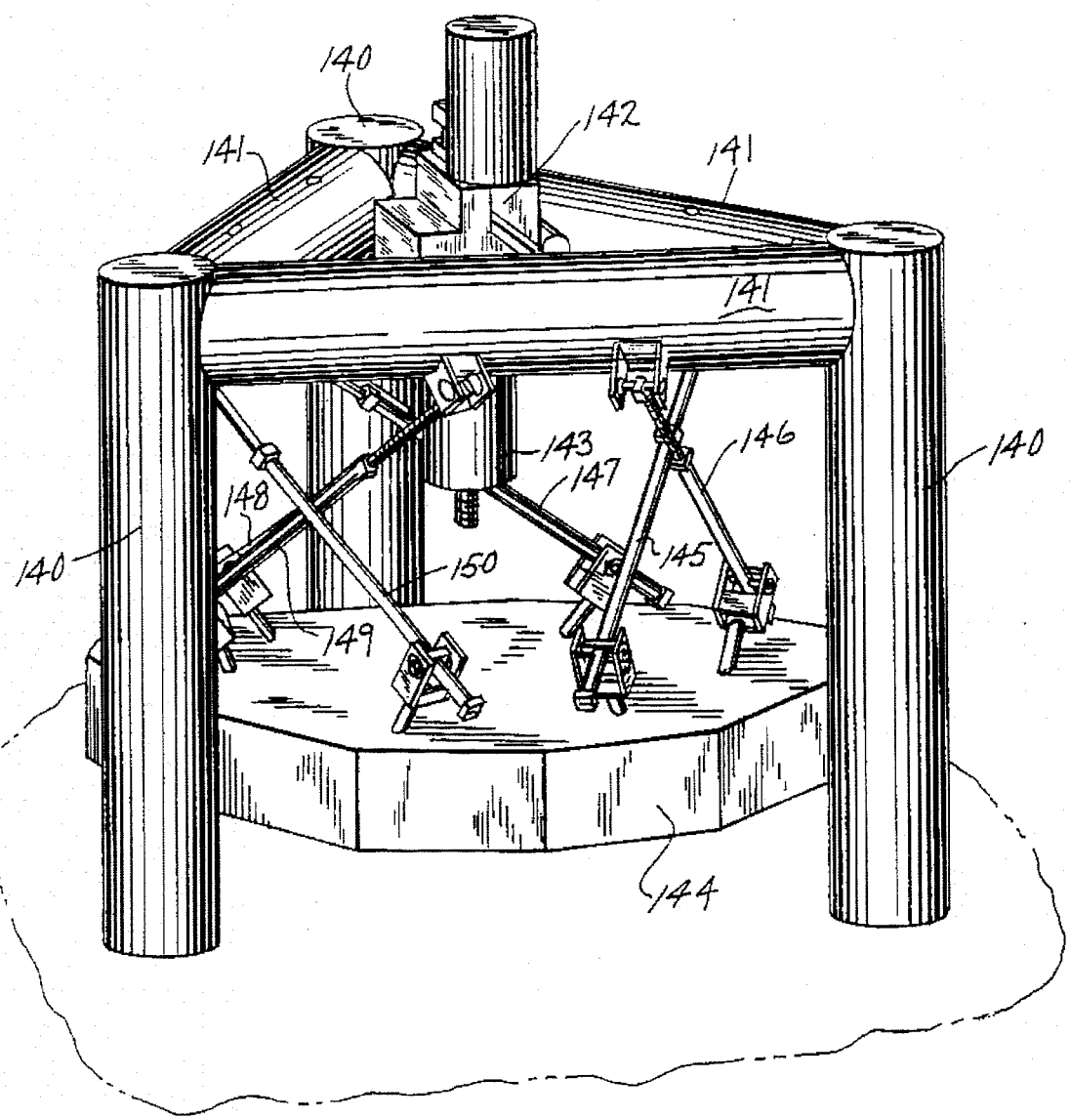
FIG. 11 is a view in perspective of a fourth embodiment of a machine tool assembly for use with the machine tool isolation system in accordance with the invention.

In the fourth embodiment of FIG. 11, one of the platforms is elevated and the second platform is suspended from the first platform on the six legs. Specifically, a support structure is formed from three upright columns 140 jointed together by a triangular framework of members 41. A spindle housing 142 is supported on the triangular framework of members 141 with a spindle 143 pointing downwardly towards a workpiece platform 144. The workpiece platform 144 is suspended on six extensible powered legs 145–150 which are arranged in pairs of crossing legs, similar to the arrangement of the legs 40–45 in the second embodiment of FIGS. 3, 4 and 5. The workpiece platform 144 may mount a pallet with a workpiece (now shown) in the usual manner. The legs 145–150 are pivotally joined at their upper ends to the members 141 and at their lower ends to the workpiece platform 144 in a manner similar to that of the second embodiment.

One advantage of suspending a platform on the six legs is that in case of a gross power failure which could cause the power legs to lose their ability to support a platform, the work platform 144 would move away from the spindle. This would result in no damage to either the spindle, the tool, or the workpiece because there would be no collision between the parts. In contrast, in an arrangement as shown in the first and second embodiments, a gross power failure in which the power legs lose their ability to support a platform could result in the spindle crashing in to the workpiece or workpiece support.

Instead of the workpiece platform being suspended beneath the spindle platform, the workpiece platform could be above a suspended spindle platform. Then, chips would naturally fall away from the workpiece.

Figure 12:
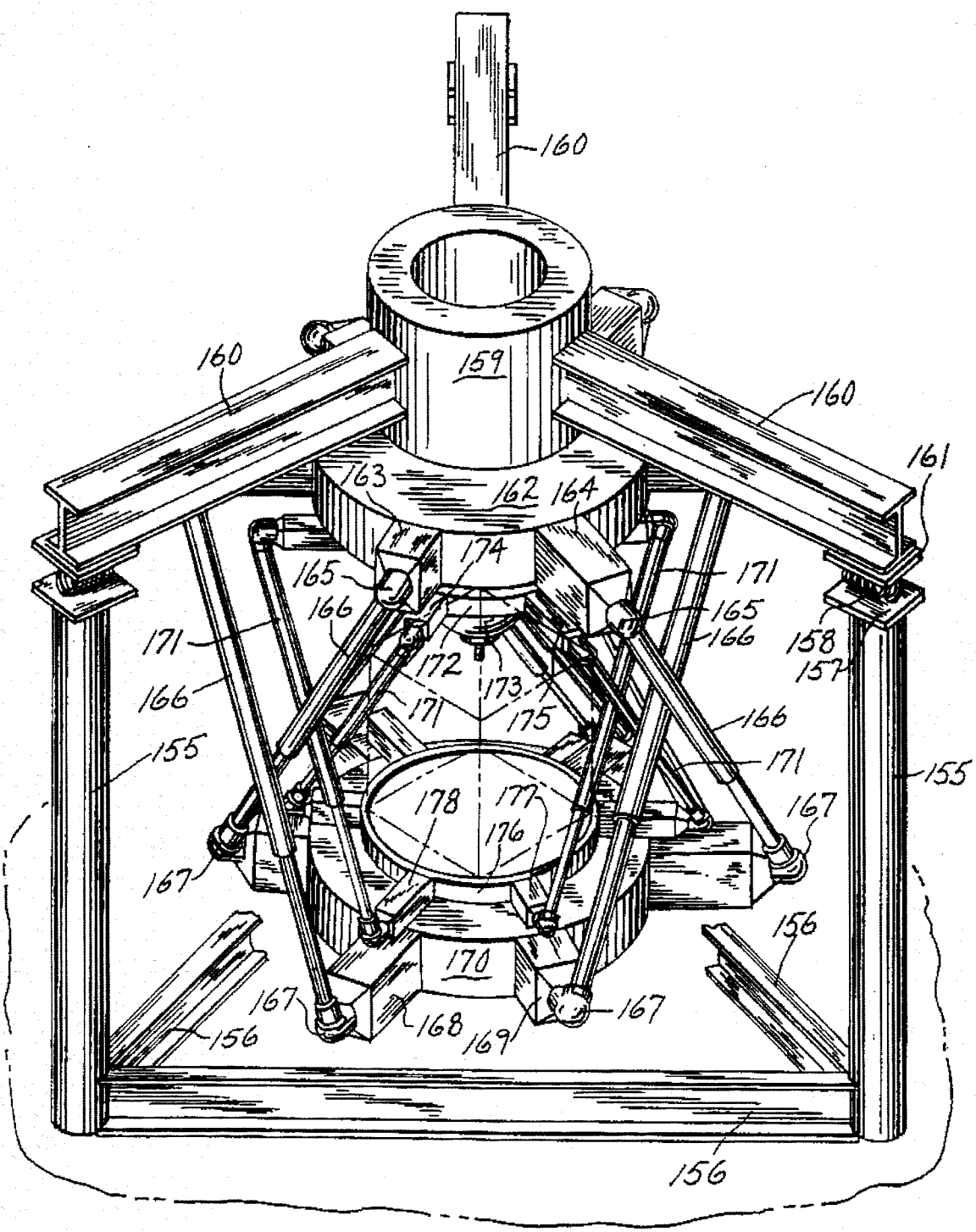
FIG. 12 is a view in perspective of a fifth embodiment of a machine tool assembly for use with the machine tool isolation system in accordance with the invention.

The fifth embodiment of FIG. 12 also suspends a workpiece platform from a support. In addition, it provides an instrument arm associated with each of the six power legs and a spoke-like system of connects of the ends of the powered legs and instrument arms to the platform and support.

Specifically, the fifth embodiment of FIG. 12 has three upright columns 155 joined at their base by three I-beams 156 (two of the beams are shown foreshortened for clarity). The top of each column 155 carries a bearing plate 157 on which a vibration isolation member such as a coil spring 158 rests. A spindle housing 159 has three radiating support arms 160 in the form of I-beams. The outer ends of the support arms 160 each mounts a bearing plate 161 which rest upon a respective isolation member 158.

The spindle head 159 is mounted on top a ring platform 162 from which two series of spokes 163 and 164 project. The spokes 163 and 164 are of two lengths that alternate around the ring platform 162 and the spokes mount the universal joints 165 that connect the upper ends of six powered legs 166 to the platform 162. The lower ends of the powered legs 166 are connected to universal joints 167 mounted at the ends of spokes 168 and 169 which project radially from a ring-like work platform 170. The spokes 163, 164 and 168, 169 are of different lengths to accommodate the overlapping and crossing arrangement of the powered legs 166, which is similar to that in the second and fourth embodiments.

A similar arrangement of rings and spokes is used to mount universal joints at the ends of six instrument arms 171. That is, a second ring structure 172 is disposed beneath the ring support 162 at the spindle end and about the spindle 173. A series of radially projecting spokes 174 and 175 of two different lengths project from the ring 172. The bottom workpiece platform 170 contains a second ring 176 from which two series of spokes 177 and 178 project to mount the universal joints at the bottom ends of the instrument arms 171. The instrument arms 171 are arranged in pairs of crossing arms in the same manner as the powered legs 166.

The use of spokes emanating from the platform allows the powered legs and instrument arms to be removed from close proximity to the central axis of the spindle head and workpiece support with the result that it is easier to load a workpiece onto the workpiece platform. This is illustrated in FIG. 12 in which a phantom line identifies a cubic workpiece which could be accepted by the machine tool and it may be noted that there is an opening through the powered legs 166 and instrument arms 171 to accommodate the insertion and removal of a workpiece of that size.

The ring structure 172 and the ring 176 can be structurally independent from the ring platform 162 and the work platform 170, the instrument arms 171 can be structurally isolated from the deflections of the platforms induced by the powered legs 166.

Figure 13:
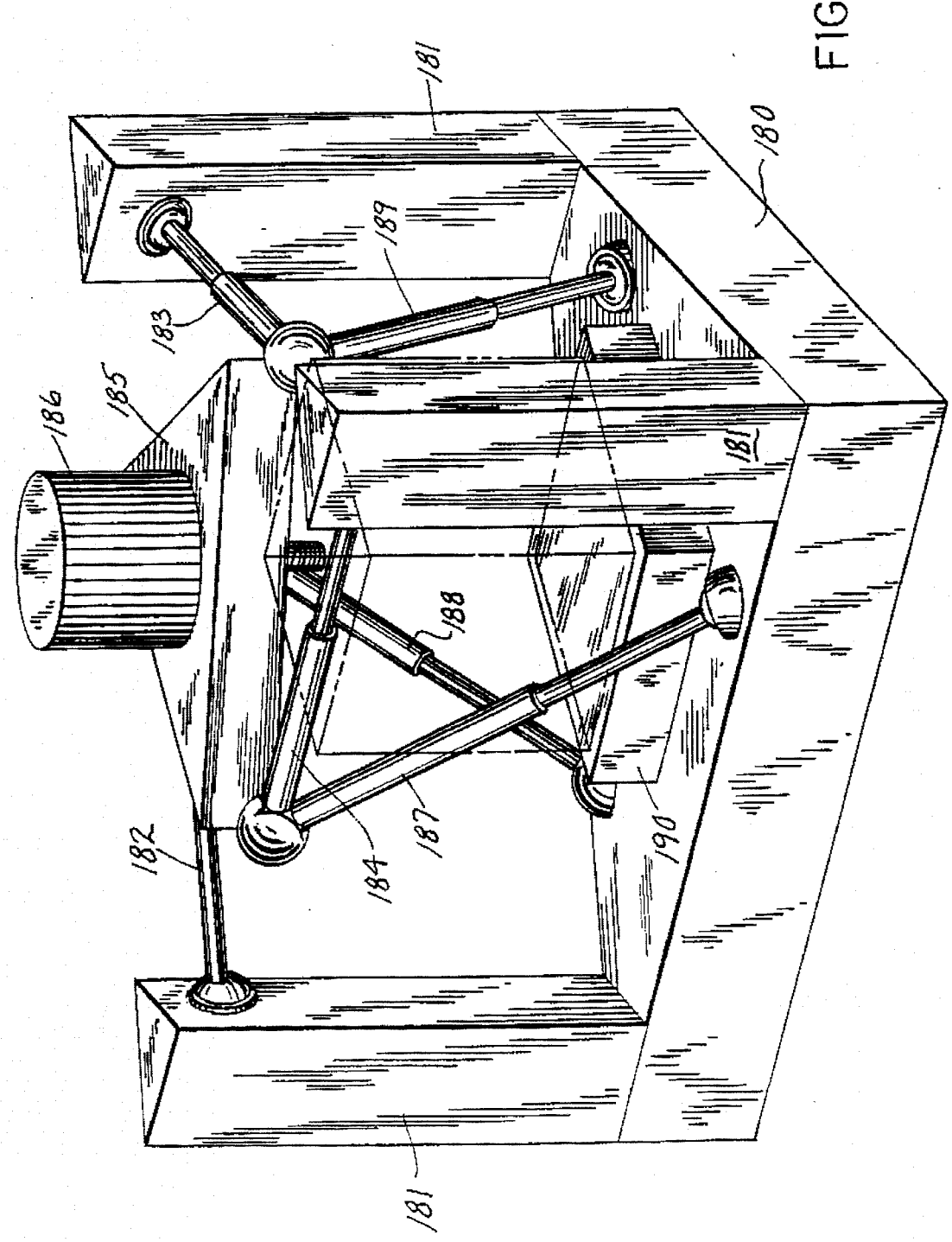
FIG. 13 is a view in perspective of a sixth embodiment of a machine tool assembly for use with the machine tool isolation system in accordance with the invention.

The sixth embodiment of FIG. 13 arranges three of the six legs in a different attitude than that of the prior embodiments. Specifically, three of the legs are mounted in or near a common plane that includes the upper platform. As shown in FIG. 13, a base 180 of generally triangular shape mounts triangular columns 181 at each of its corners. Three powered legs 182, 183 and 184 extend from universal joints disposed near the upper end of each of the columns 181. The other ends of the three legs 182, 183 and 184 are mounted in universal joints at the corners of a triangular spindle platform 185 which mounts a spindle head 186. The remaining three powered legs 187, 188 and 189 extend from universal joints in the base 180 upward to the three corners of the triangular spindle platform 185. A workpiece platform 190 rests on the base 180 within the envelope of the three lower legs 187, 188 and 189.

The embodiment of FIG. 13 functions in the same manner as the other embodiments and demonstrates that it is not necessary for the legs to extend between two planes, so long as the legs extend between the two platforms. The six legs in the embodiment of FIG. 13 extend from the workpiece platform represented by the base 180 and its columns 181, and to the spindle platform 185.

FIGS. 14–17 illustrate a ball screw driven powered leg usable with the machines of the present invention. Generally, a rotatable ball screw rod 195 is mounted with a stationary platform yoke assembly indicated generally by the reference numeral 196. A nut tube 197 surrounds and is operatively connected to the ball screw rod by a plurality of recirculating balls 197'. The nut tube 197 is connected to a movable platform yoke assembly indicated generally by the numeral 198. The yoke assemblies 196 and 198 are connected to the stationary and movable platforms of the machine tool, respectively. The ball screw rod 195 is rotated by a hydraulic or electric motor 199 mounted on a bracket 200 connected to the stationary yoke assembly 196. The motor has an output shaft 201 connected to the ball screw rod 195 by a toothed belt 202 operating between pulleys connectively to the output shaft 201 and the ball screw rod 195. The ball screw rod 195 is journaled in a pair of thrust bearings 203 mounted in a cage associated with a motor fork 204 that forms part of the stationary platform yoke assembly 196. A bellows 205 is connected at one end to the nut tube 197 and at the other end to a tube 206 which, in turn, is connected to the motor fork 204.

As the ball screw rod 195 is rotated by the motor 199, the nut tube 197 will move along the length of the rod 195 in a direction dependent upon the direction of rotation of the rod 195. The effect will be to reduce or extend the distance between the yoke assemblies 196 and 198 thereby varying the effective length of the leg.

Figure 16:
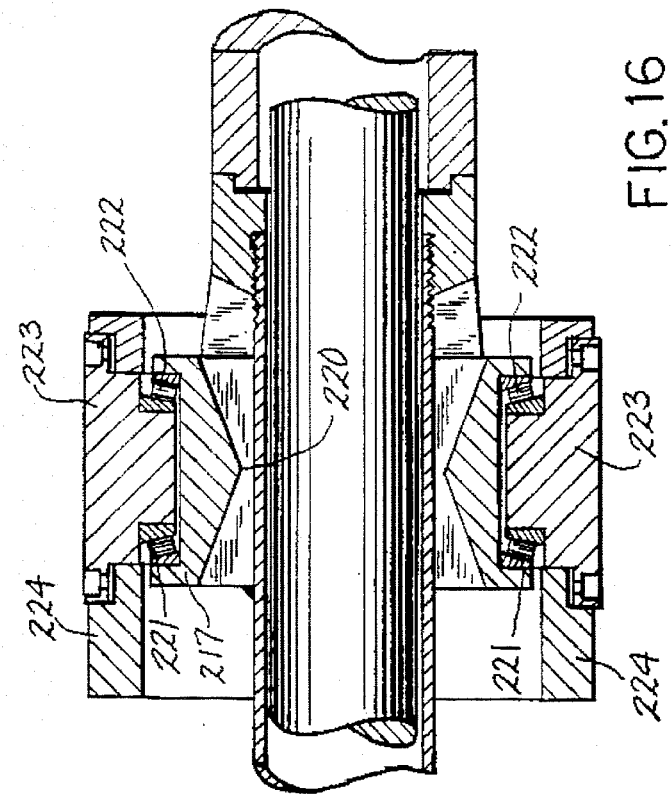
FIG. 16 is a view in longitudinal cross section through the yoke assembly of FIG. 15 and taken in the plane of the line 16—16 in FIG. 14.
Figure 15:
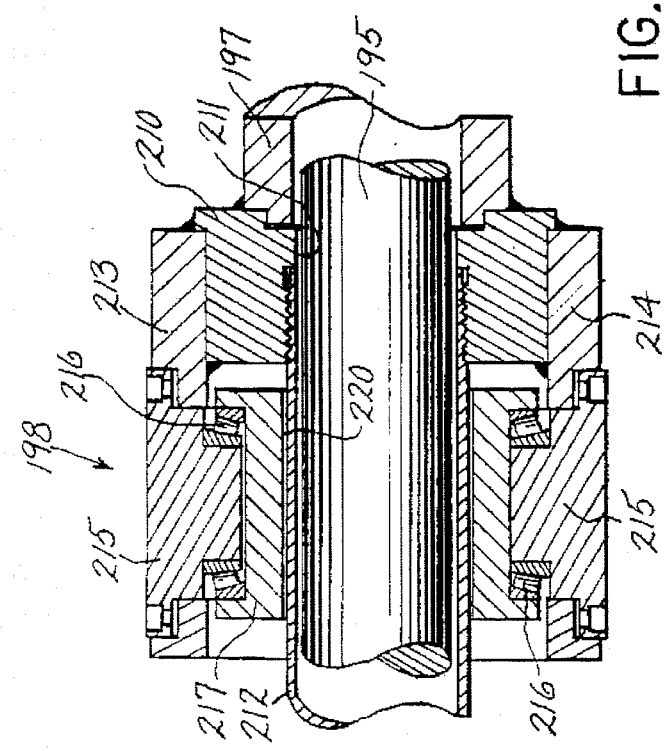
FIG. 15 is a partial view in longitudinal cross section, to an enlarged scale, of one of the yoke assemblies for connecting the powered leg to a platform or support.

Referring specifically to FIGS. 15–17, the movable platform yoke assembly 198 includes a U-shaped fork 210 which is connected to the nut tube 197 and which has a central opening 211 through which the screw rod 195 passes. A protective tube 212 extends from the fork 210 along the outside of the screw rod 195. The side arms 213 and 214 of the fork 210 mount bearing holders 215 that hold the inner race of thrust bearings 216 which are received in recesses in opposite side faces of a block 217. The block 217 has a central opening 220 which is flared from the mid-point of the opening towards the opposite ends of the block 217, as shown in FIG. 16. The remaining two side faces of the block 217 have bearing recesses 221 which receive thrust bearings 222 held in place by a bearing retainers 223. The bearing retainers 223 are mounted in spaced arms 224 of a second fork attached to the movable platform. By reason of the construction, the two forks are disposed at 90° from each other.

As will be appreciate, the yoke assembly 198 allows rotary motion about an axis through the bearings 222 and rotary motion about an axis through the bearings 216. The flared shape of the opening 220 accommodates the latter rotary motion. The construction and operation of the fixed platform yoke assembly 196 is the same as that described for the movable platform yoke assembly 198.

Mounting the yoke assemblies at points along the length of the powered leg, rather than at the ends, results in a significant increase in the ratio of the maximum to minimum distance between the yoke assemblies as the leg moves.

Figure 14:
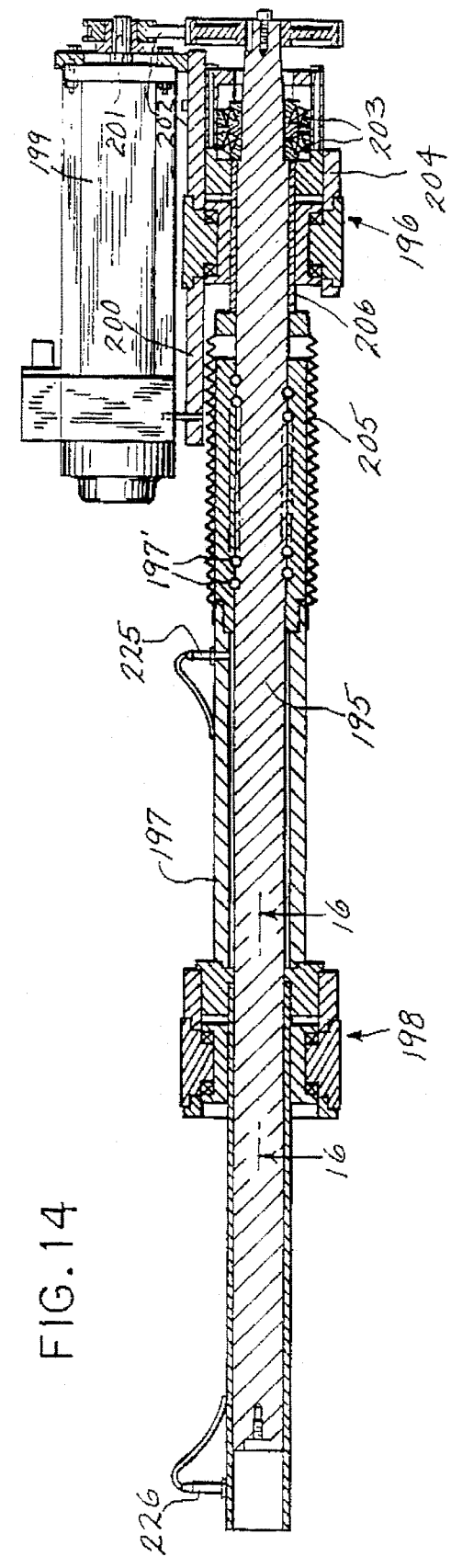
FIG. 14 is a view in longitudinal section of a powered extensible leg usable with the machine tools.

A first proximity switch 225 is mounted in the nut tube 197 near the cage for the balls. A second proximity switch 226 is mounted near the end of the protective tube 212. The proximity switches 225 and 226 are used to halt motion when the ball screw rod 195 reaches the limits of its allowed motion. That is, when the end of the ball screw rod 195 changes the state of the proximity switch 226, the power leg will have been shortened to its pre-established limit of travel. The condition showing FIG. 14 is near that short limit of travel. On the other hand, when the end of the ball screw 195 changes the state of the proximity switch 225, the length of the powered leg will have been extended to its maximum desired limit. In both cases, the proximity switches 225 and 226 affect the continued actuation of the motor 199.

One form of instrument arm usable with the machine tools of the present invention, is illustrated in FIGS. 18 and 19. One end of the instrument arm is formed with a solid rod 230 which anchors one end of a first tube 231. The other end of the tube 231 mounts a slide bearing 232 which slides about the outer one of a pair of concentric stationary tubes 233 and 234. The stationary tubes 233 and 234 are each anchored on a rod 235 forming the opposite end of the instrument arm. An outer protective tube 236 is also anchored to the second rod 235 and surrounds the first tube 231. It can be seen therefore, that the first tube 231 can telescope relative to the stationary tubes 233 and 234 and the protective tube 236.

One end of a scale rod 238 is anchored in the solid rod end 230 of the instrument arm. The opposite end of the scale rod 238 is attached to a piston 239 which slides within the inner stationary tube 234. A read head 240 surrounds the scale rod and is attached to the free end of the inner and outer stationary tubes 233 and 234. The read head 240 is therefore stationary with respect to the fixed end 235 of the instrument arm and the scale rod 238 can move longitudinally within the read head 240 as the instrument arm is extended or contracted. The scale rod 238 and reading head 240 are of known construction and operation. Generally, the read head will sense increments of motion along the scale rod as the two are moved relative to each other and will produce a signal which when amplified is used in a known manner to indicate the relative position and changes in position of the two parts. A usable digital positioning measuring system of scale rod and read head may be that built by Sokki Electronics Corporation and identified as the JS7 series of digital positioning systems.

It is important in the operation of the read head and scale rod that the scale rod be kept taut. To that end, air pressure is introduced to act upon the piston 239 which mounts one end of the scale rod 238. The air under pressure is introduced through a central bore 245 in the fixed end 235 of the instrument arm and the air under pressure travels through the space between the inner and outer tubes 233 and 234 and to and through an opening 246 in the inner tube 234 adjacent is attachment to the read head 240. This introduces pressurized air or the hollow interior of the inner tube 234 in which the piston 239 rides. An orifice passageway 247 extends longitudinally through the read head 240 so that the space between the solid rod 230 of the instrument arm and the read head 240 is connected to the hollow interior a vacuum is not created in that space as the two ends of the instrument arm move relative to each other. The space between the inner and outer stationary tubes 233 and 234 is also used to accommodate wiring 248 connecting the read head to the exterior of the instrument arm.

The instrument arm is preferably mounted in a manner similar to that of the powered legs using yoke assemblies. As with the powered legs, to increase the ratio of the maximum to minimum distance between the yoke assemblies, the yoke assemblies are preferably mounted intermediate the ends such as at the locations 249 and 250 identified in FIG. 18.

The movable end 230 of the instrument arm includes a transverse casting 255 having an inlet 256 and an outlet 257 for air under pressure. The inlet and outlet are connected to a central circular raceway 258 in which a ball bearing 259 is disposed. Air under pressure introduced into the casting 255 will cause the ball bearing 259 to roll rapidly along the raceway 258. This will induce an eccentric motion to the end 230 of the instrument arm about the longitudinal axis of the arm. This eccentric motion is useful to insure that the telescoping elements of the instrument arm can slide smoothly with respect to each other. At the same time, the vibratory motion induced by the spinning ball bearing 259 is in a direction transverse to the direction of motion being measured and therefore does not significantly affect that measurement.

FIG. 20 illustrates a form of instrument arm which uses a laser interferometer. The instrument arm is formed of concentric inner and outer tubes 260 and 261, respectively, that slide past each other on bearings 262 which preferably are made of a polytetraflouride material. A bellows 263 connects the end of the outer tube 261 to the outside of the inner tube 260 so as to close off the volume within the tubes and prevent contamination through the bearings 262. A laser beam from a laser light source 264 enters the hollow interior of the instrument leg through a window 265 and is reflected off a mirror 266 into an interferometer 267 where it is divided into two components. One component exits the interferometer and travels inside of the tubes to a retro-reflector 268 which is mounted at the closed end of the outer tube 261. Light is reflected back down the tubes towards the interferometer 267. The two light beam components are recombined within the interferometer 267 and the combined components interfere with each either constructively or destructively depending on their phase. A photo detector within the laser source 264 detects the fringes that result from the interferences between the two components of the light beam as the retro-reflector 268 moves relative to the interferometer. The phase is dependent upon the distance between the interferometer 267 and the retroflector 268 and the fringes are therefore indicative of changes in length of the instrument arm.

The number of light waves in transit between the interferometer 267 and the retro-reflector 268 depends not only on the distance between the two but also on the speed of light. The speed of light in air is dependent upon the atmospheric pressure, temperature and humidity. Pressure and temperature have the largest effect and therefore they must be known if the distance between the interferometer and retro-reflector is to be calculated based on the number of fringes. The air within the interior of the instrument arm is vented to a collapsible bladder 270. As the instrument arm expands, it displaces air that is stored within the bladder 270. The bladder 270 is limp at all times so that the pressure within the arm is equal to the ambient pressure outside of the arm. A single pressure transducer can then be used for all of the instrument arms to determine the pressure of the air through which the light beam is passing.

A temperature measurement transducer 271 senses the internal temperature in each instrument arm since the temperature may be localized. The effect of humidity is negligible and is ignored.

Instead of an instrument arm that has a structural integrity, it is possible to use known forms of position transducers to measure the distance between the platforms. An example of a usable position transducer is the cable actuated displacement transducers available from Houston Scientific International, Inc. and identified as the 1850 Series. In using such a transducer, a cable would be connected to one of the platforms and the transducer housing to the other platform. A potentiometer within the housing would provide a signal indicative of the length of cable extending from the housing at any particular position of the machine tool components.

A combination of measurements using the power legs and instruments arms can also be used to speed up positioning of the components of the machines. For example, the powered legs could be provided with a linear scale (such as in FIG. 8) or a rotary resolver or shaft encoder (such as in FIG. 9) to provide a position feedback signal that allows a gross positioning of the platforms relative to each other. An associated instrument arm could then be used for fine positioning with the powered legs being moved at a slower rate to the final desired position.

The angles that the powered legs make with the platforms will effect the stiffness of the machine and the accuracy of the positioning of the tool relative to the workpiece. The optimum position of the legs relative to the platforms for achieving optimum vertical and horizontal stiffness would be about 35°. This assumes that each platform exhibits stiffness along its orthogonal axes. For achieving the best vertical and horizontal resolutions to achieve accuracy, at nominal positions the optimum angle of the legs relative to the platforms is about 41°.

The typical part program for a machine tool is designed to provide blocks of instruction concerning the X,Y,Z,A,B,C coordinates of the tool tip and workpiece relative to each other. Because the six legs of a machine tool in accordance with the present invention do not align themselves with the normal orthogonal coordinates, a method must be developed to relate the normal coordinate block instructions to the length of the six legs. The following method has been developed for that purpose. The steps are arranged in logic sequence form and can be summarized as follows:

I. Initializing present machine X,Y,Z,A,B,C coordinates
II. For each of six legs:
   A. Initialize top and bottom pivot vector coordinates.

B. Calculate and initialize present leg length.

C. Define X,Y,Z,A,B,C home position for present leg length.

III. Set sub-block time (typically 0.02 seconds) sufficiently short to achieve desired linearity and precision of movement.

IV. For each part program:
  A. For each block:
    1. From the part program read machine coordinates of destination; X,Y,Z,A,B,C and feed rate
    2. Using feed rate and sub-block time, compute the number of sub-blocks required to reach block destination.
    3. For each sub-block:
      (a) For each of six coordinates:
        1. Present value=ending value of previous sub-block.
        2. Ending value=(destination value minus present value) divided by number of sub-blocks remaining plus present value.
      (b) Using the ending value of the six coordinates, compose a sub-block ending vector
      (c) For each leg:
        1. Rotate the top pivot vector to the ending angles for the current sub-block.
        2. Add a sub-block ending vector to the result.
        3. Subtract the bottom pivot vector from the result.
        4. Calculate the ending leg length by extracting the square root of the sum of the squares of the coordinates of the result of step (c)3.
        5. Convert the ending leg length to the nearest integral servo position command count.
        6. Send the position count to a servo command buffer.
        7. Calculate the leg velocity required to reach new leg length in one sub-block time.
        8. Convert the leg velocity to the nearest integral servo command count.
        9. Send velocity count to the servo command buffer.
      (d) Send sub-block start command simultaneously to all leg servos.
  B. A block is completed when no sub-blocks remain.
V. The task is completed when no blocks remain in the part program.

Initializing the present machine is a process which is known in the machine tool art as gridding. It establishes a home position in which the tip of the tool and the center of the workpiece cube are coincident.

As illustrated in FIG. 12, the use of a vibration isolation assembly, such as cable coil spring 158, can be helpful in isolating the machine tool from its surrounding support structure such as a floor or the columns 155 illustrated in FIG. 12. The support structure is ultimately attached to the earth which, in combination, has as extremely large mass relative to the machine tool. The isolation of the machine tool from rigid contact with the support structure in other words, the decoupling of the machine tool from the mass of the support structure and the earth raises the natural frequency of the actuator mechanism acting between the machine tool platforms and helps reduce the harmful effects of vibration. It is also helpful to combine a damper with the spring in the vibration isolation assembly to damp the amplitude of vibrations initiated by movement of the machine tool platforms and interaction of the operator and object. This will permit cutting of a finer, more precise surface on the workpiece.

Additionally, the vibration isolation assembly permits higher relative acceleration between the platforms, and specifically between the tool and the workpiece, so finer details may be machined in the workpiece without compromising adherence to the pre-programmed path and feed rate. For example, the vibration isolation component facilities contouring a given radius of curvature at a higher feed rate with the same amount of force moving the platforms.

Figure 21:
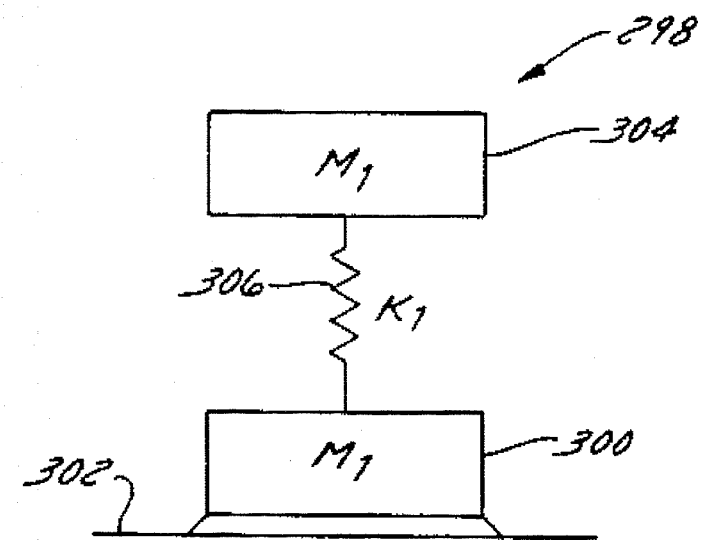
FIG. 21 is a schematic representation of a prior art machine tool connected rigidly to a support structure.

A machine tool 298 affixed to its support structure and alternatively a machine tool cooperating with a vibration isolation component 308 is represented schematically and described in greater detail with reference to FIGS. 21–22, respectively. As illustrated in FIG. 21, a base platform 300 is rigidly connected to a support structure, such as a floor 302, as is done with conventional machine tools. Base platform 300 is connected to an upper platform 304 by an actuator mechanism 306 that is capable of moving platform 304 in a plurality of directions with respect to platform 300. Actuator mechanism 306 may include the six extensible legs described above in various embodiments but is represented schematically as a spring because any mechanical actuator mechanism has spring characteristics. It should be noted that although the platforms are referred to as a base platform and an upper platform for descriptive purposes, the platforms could be arranged in orientations other than one above the other.

Figure 22:
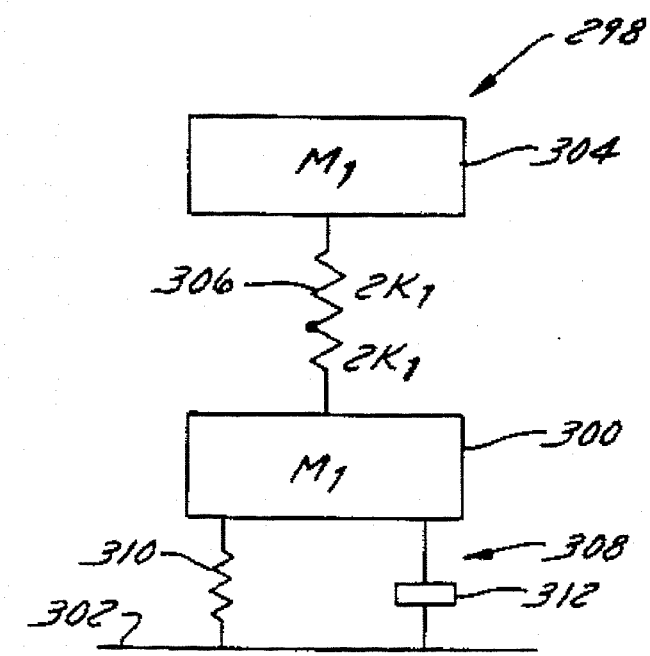
FIG. 22 is a schematic representation of a machine tool combined with a vibration isolation device according to a preferred embodiment of the invention.

In the schematic representation of FIGS. 21 and 22, the vibrational analysis is calculated with respect to only one axis lying along the spring. It should be realized that in actual application, e.g. when the platforms are connected by the six extenible legs, the vibrational effects may occur along six different axes and a similar analysis can be conducted for each axis.

In the schematic representation, moveable platform 304 has a mass represented by $M_1$ but base platform 300 is affixed to its support structure so it is reasonable to assume its mass is $M_1$ plus the mass of the object to which it is rigidly attached. Because the support structure is mounted on a foundation that is ultimately indirectly or directly coupled to the earth, a good approximation of this total mass is an infinite mass. Also, actuator mechanism 306 has inherent spring-like characteristics and its stiffness is represented by spring constant $K_1$. Thus, the natural frequency acting between platforms 300 and 304 and affecting actuator mechanism 306 can be described by the equation:

$$F_N = \frac{1}{2\pi} \sqrt{\frac{K_1}{M_1}} \qquad (1)$$

However, if base platform 300, having a mass approximately equal to $M_1$, is mounted to a vibration isolation device 308, such as that schematically illustrated in FIG. 22, the natural frequency acting between the platforms is increased by approximately the square root of 2. Vibration isolation device 308 effectively decouples base platform 300 from the mass of the earth permitting an increase in the natural frequency of actuator mechanism 306 between platforms 300 and 304. This increased natural frequency has a natural damping effect, but vibration isolation device 308 preferably further damps the amplitude of vibration oscillations established between platforms 300 and 304.

By isolating or decoupling the platforms from their supporting structure and by using platforms of approximately equal mass, the spring characteristics of the actuator mechanism 306 effectively acts as though the single spring illustrated in FIG. 21 is actually two springs of equal length, each spring having a spring constant of $2K_1$ (see FIG. 22). Because each spring can be considered separately, the natural frequency is calculated as raised by a factor equal to the square root of 2. This maximum natural frequency acting between platforms 300 and 304 can be expressed by the equation:

$$F_N = \frac{1}{2\pi} \sqrt{\frac{2K_1}{M_1}} \qquad (2)$$

If the platform masses are not equal, the increase in the natural frequency is less, but it may still be sufficient for many applications. As the disparity in platform masses increases, the corresponding increase in natural frequency is reduced. Accordingly, the ratio of platform masses is preferably approximately 0.5 to 2.0, more preferably approximately 0.75 to 1.25, and most preferably approximately 0.9 to 1.1.

Preferably, vibration isolation assembly 308 includes a spring 310 and a damper 312. Damper 312 can be connected between base platform 300 and movable platform 304, but this arrangement tends to inhibit the movement of platform 304 with respect to platform 300. Therefore, preferably both spring 310 and damper 312 are mounted between the base platform 300 and support structure 302.

If vibration isolation device 308 includes only spring 310, the natural frequency of machine tool 298 is increased, but detrimental relative vibration of platforms 300 and 304 may remain because actuator mechanism 306 has characteristics similar to an undamped spring. Thus, the addition of damper 312 is preferred to reduce this relative vibration.

Spring 310 and damper 312 may be combined in a single material, such as a resilient pad having spring and damping characteristics. Examples of resilient pads that can be used to help isolate the machine tool from its supporting structure include pads made from a variety of rubbers, plastics and composite materials. Plastic or rubber reinforced with fiberglass or felt fibers are effective. One preferred material is a polymer having high damping characteristics and sold by EAR Speciality Composites Corporation of Indianapolis, Ind. under Spec. No. C-1002-99. This material preferably has a durometer rating of approximately 56 measured on the Shore A Scale. A similar material is supplied by Sorbothone, Inc. of Kent, Ohio. Another pad material having spring and damping characteristics is cable, such as steel cable, that is coiled like a helical spring and laid on its side between the machine tool and its support structure. (See FIG. 12) Of course, the coils of cable must be held in place by rigid supports attached thereto, and the diameter of the cable must be sized according to the weight and actuating forces exerted by the machine tool. These matters are well within the ken of the artisan, guided by the principles set forth herein.

Vibration isolation component 308 also helps isolate the machine tool from environmental vibrations. For example, the movement of trains or trucks in proximity to working machine tools can induce vibrations in the floor capable of affecting the precision machining of workpieces. Vibration isolation component 308 substantially dissipates those environmental influences.

Additionally, vibration isolation component 308 permits greater acceleration of one platform with respect to the other. The acceleration of each platform equals the force exerted by actuator mechanism 306 against that platform divided by the mass of the platform, i.e. platform acceleration=force-$_{actuator}$/mass$_{platform}$. The maximum relative acceleration of one platform relative to the other is determined by calculating and summing the maximum acceleration for each platform.

In the conventional machine tool illustrated in FIG. 21, bottom platform 300 is affixed to floor 302 which, in turn, is ultimately coupled to the earth, and thus its mass is assumed to be an infinite mass. Therefore, the relative acceleration of platform 304 with respect to platform 300 can be calculated as follows:

$$\frac{\text{Relative}}{\text{Acceleration}} = \frac{\text{Force}_{actuator}}{M_1} + \frac{\text{Force}_{actuator}}{\text{Infinity}} = \frac{\text{Force}_{actuator}}{M_1} \qquad (3)$$

In the inventive embodiment illustrated in FIG. 22, base platform 300 is not fixed to floor 302, but rather is loosely mounted on vibration isolation component 308 to permit movement of platform 300 in response to the force exerted by actuator mechanism 306. Thus, the relative acceleration of the platforms can be estimated as follows:

$$\frac{\text{Relative}}{\text{Acceleration}} = \frac{\text{Force}_{actuator}}{M_1} + \frac{\text{Force}_{actuator}}{M_1} = \frac{2\text{Force}_{actuator}}{M_1} \qquad (4)$$

In other words, by isolating the machine tool via vibration isolation component 308, the relative acceleration of two platforms of approximately equal mass is double the relative acceleration obtainable when one of the platforms is rigidly attached to a support structure, effectively providing it with an infinite mass.

Even in actual applications, a machine tool having platforms of approximately equal mass mounted on a vibration isolation component 308 can nearly double the relative acceleration of the platforms compared to a machine tool in which the base platform is rigidly attached to the support structure. For example, a machine tool having a milling cutter attached to one platform can cut around a smaller radius of curvature at the same feed rate when provided with a vibration isolation component 308. This assumes that component 308 isolates the machine tool platforms from rigid attachment to the external support structure and also assumes a given amount of force is provided by actuator mechanism 306 in both situations. Although mounting the machine tool on a pad, such as a rubber pad, does not allow platform 300 complete freedom of movement as it would have if it were floating in space, there is still a substantial increase in relative acceleration between the platforms which dramatically facilitates more rapid changes in cutter direction.

In an actual application, vibrations would occur along more axes than the single axis illustrated in FIGS. 21 and 22. Depending on the type of machine tool, vibrations could be established along six different axes, commonly referred to as X,Y,Z,A,B, and C axes and resulting from linear and torsional forces exerted during movement of the platforms with respect to each other. As a result, it is often desirable to divide the vibration isolation assembly into sections or components that are spaced from one another to absorb vibrations resulting from both linear and torsional forces. For example, the resilient pad can be separated into three sections disposed at separate outlying areas between base platform 300 and its support structure. However, those resilient pads must be able to incur both compressive and shear forces. Therefore, it may be desirable to use additional resilient pads disposed at appropriate angles to absorb the vibrational forces substantially in compression as described below with respect to FIG. 24.

Figure 23:
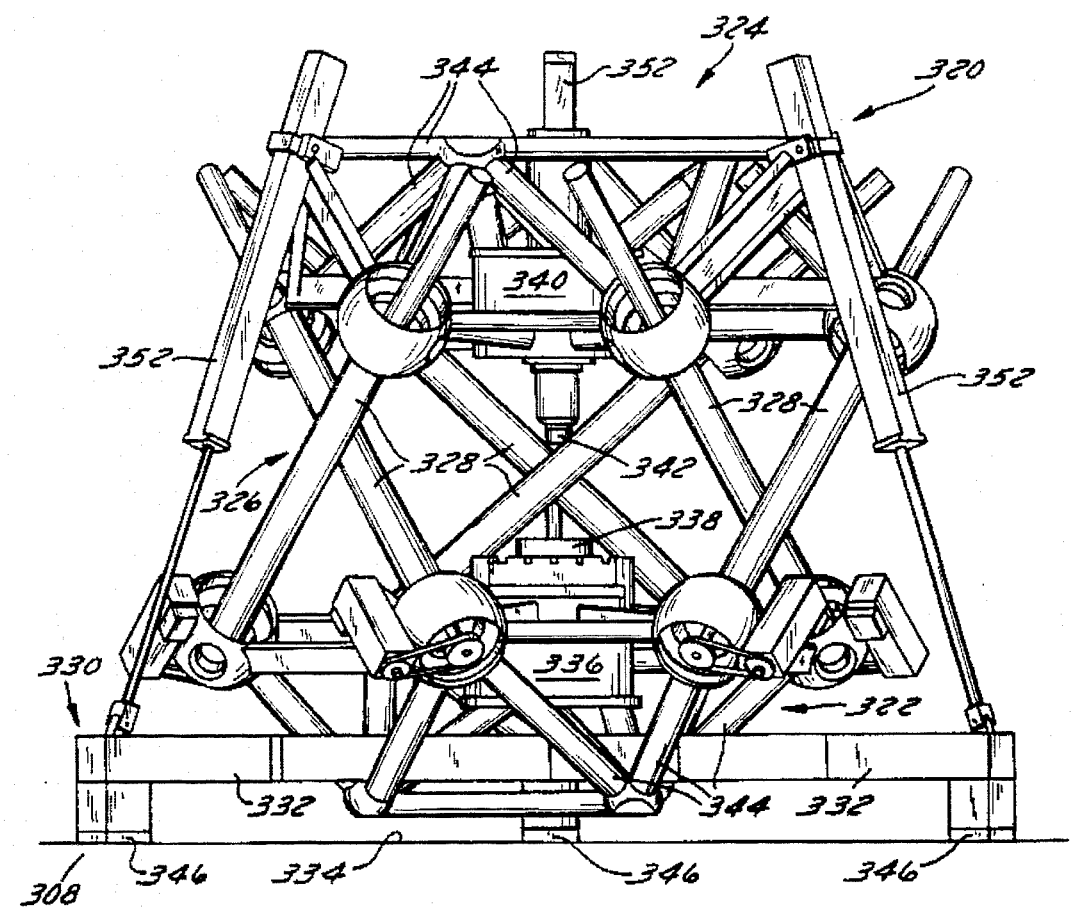
FIG. 23 is a front elevational view of an alternate embodiment of the machine tool in which the platforms are constructed as space frames and mounted to a vibration isolation component.

A practical example of a machine tool cooperating with a vibration isolation component is illustrated in FIG. 23. Further description of this machine tool can be obtained from U.S. patent application, Ser. No. 08/261,682 filed on Jun. 17, 1994 which is hereby incorporated by reference and relied on. A machine tool 320 includes a lower or base platform 322 connected to an upper platform 324 by an actuator mechanism 326. Actuator mechanism 326 preferably includes a plurality of extensible legs 328 such as the extensible legs described with reference to FIGS. 14–17.

In the illustrated embodiment, base platform 322 includes a base 330, preferably having a plurality of legs 332. Although various numbers of legs can be used, it is desirable to use three legs configured to rest on a support structure such as a floor 334. Base platform 322 also includes an object holder 336 configured to hold an object such as a workpiece 338.

Upper platform 324 includes a tool holder 340 configured to hold a tool 342. Tool 342 interacts with workpiece 338 when upper platform 324 is moved along a pre-programmed path relative to base platform 322 by actuator mechanism 326.

In this embodiment, both platforms 322 and 324 are each formed as a space frame having a plurality of interconnected struts 344. The construction of space frames using struts 344 renders rigid yet relatively lightweight platforms 322 and 324.

Figure 23A:
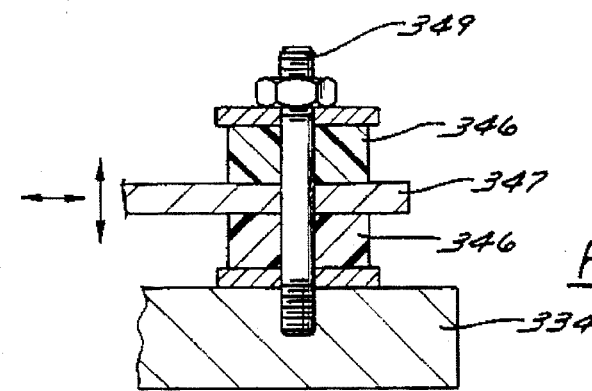
FIG. 23a is a cross-sectional view of one exemplary embodiment for attaching a leg of the machine tool to a support.

Vibration isolation component 308 is attached to the bottom of base 330 which, in this embodiment, is at the bottom of legs 332. The particular vibration isolation device illustrated includes a pair of resilient pads 346 disposed between each leg 332 and floor 334. Preferably, pads 346 are disposed on either side of a portion 347 of legs 332 and legs 332 are held by a bolt 349 which maintains pads 346 in slight compression (see FIG. 23a). Also, resilient pads 346 include a material such as those described above having both spring characteristics and damping characteristics. However, vibration isolation device 308 can comprise springs without dampers, combinations of separate springs and dampers, or other materials having appropriate spring rate and damping characteristics. Additionally, vibration isolation device 308 is not limited to use with this particular embodiment, but can also be used with other machines and machine tools such as those illustrated and described above. For example, a resilient pad 348 may be disposed between base 10 of the machine tool illustrated in FIG. 1 and a floor 350.

It should also be noted that machine tool 320 may optionally include a plurality of counterbalances 352 to counter intertial effects. Counterbalances 352 are preferably gas springs connected between base platform 322 and upper platform 324.

The mass ratio of base platform 322 to upper platform 324 is preferably in the range from approximately 0.5 to 2.0. However, it is often desirable for the mass of base platform 322 to be as close as possible to the mass of upper platform 324 to optimize the natural frequency of the system.

Figure 24:
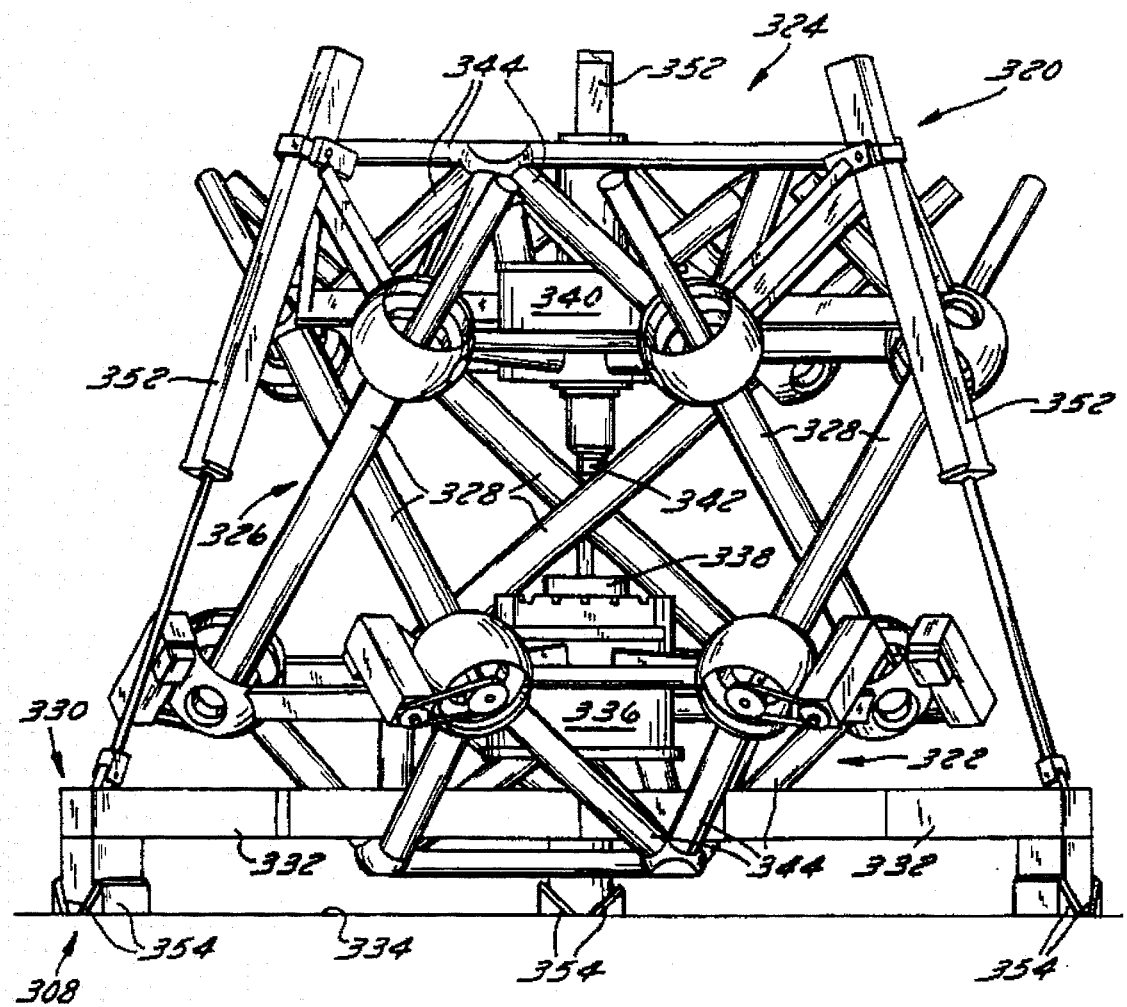
FIG. 24 is a front elevational view of an alternate embodiment of the machine tool and vibration isolator illustrated in FIG. 23.

Alternatively, machine tool 320 may be mounted on a vibration isolation device 308 as illustrated in FIG. 24. As illustrated, vibration isolator 308 includes a plurality of damping components, such resilient pads 354, preferably arranged at outlying regions of base 330. Pads 354 are arranged at angles with respect floor 334 to isolate machine tool 320 from floor 334 while absorbing or damping the vibrational effects potentially produced along six different axes. The pads 354 are oriented to absorb, substantially in compression, the vibration exerted along any of the six axes. Thus, the pads need only damp the vibrations in compression rather than in shear. This makes it easier to select damping materials because only knowledge of the linear or compressive characteristics of the material is necessary to design the overall isolation system. The appropriate angles and orientations of the pads 354 depend on the design of the particular machine tool and can be determined by the artisan of ordinary skill in the art relying on the teachings herein.

Although the invention has been described in relation to machine tools, it is also the usable in connection with any machine that requires that an operator be brought into position with respect to an object. It is also useful for a wide variety of tools other than the traditional cutting tool.

I claim:

1. A machine tool isolation system in which a machine tool assembly cooperates with a vibration isolation assembly, the machine tool assembly including a base platform having a plurality of base legs, the base platform being configured to receive and hold a workpiece; a tool platform configured to receive and hold a tool; and a plurality of extensible legs connected between the base platform and the tool platform to move the tool platform with respect to the base platform, the vibration isolation assembly being configured to be mounted between a supporting floor and the machine tool assembly to raise the natural frequency acting between the base platform and the tool platform, comprising:

vibration isolation means, disposed between the base legs and the floor, for decoupling the base platform from the supporting floor.

2. The machine tool isolation system as recited in claim 1, wherein the vibration isolation means includes a spring and a damper.

3. The machine tool isolation system as recited in claim 1, wherein the vibration isolation means includes a resilient pad.

4. The machine tool isolation system as recited in claim 1, wherein the vibration isolation means comprises a plurality of resilient pads, one pad being disposed between each leg and the floor.

5. The machine tool isolation system as recited in claim 3, wherein the resilient pad has combined spring characteristics and damping characteristics.

6. The machine tool isolation system as recited in claim 5, wherein the resilient pad has a durometer rating in the range from 52 to 60.

7. The machine tool isolation system as recited in claim 4, wherein there are three base legs and three resilient pads.

8. The machine tool isolation system as recited in claim 3, wherein the base platform and the tool platform have a ratio of masses ranging from approximately 0.5 to 2.0.

9. The machine tool isolation system as recited in claim 8, wherein the ratio of masses ranges from approximately 0.75 to 1.25.

10. The machine tool isolation system as recited in claim 9, wherein the tool platform has approximately the same mass as the base platform.

11. A vibration isolation system including a machine cooperating with a vibration isolator configured to isolate the machine from its support structure and to thereby raise the natural frequency within the machine, comprising:

a base machine component configured to hold an object;

an operator machine component configured to hold an operator for interaction with the object, wherein the ratio of the mass of the operator machine component to the mass of the base machine component is in the range from approximately 0.5 to 2.0;

an actuator mechanism connected between the base machine component and the operator machine component to move the operator machine component with respect to the base machine component; and a vibration isolator connected between the machine and its support structure to raise the natural frequency of the actuator mechanism acting between the base machine component and the operator machine component by a factor of at least 1.20.

12. The vibration isolation system as recited in claim 11, wherein the vibration isolator includes a material having spring characteristics effective to decouple the machine from its support structure.

13. The vibration isolation system as recited in claim 11, wherein the vibration isolator includes a spring and a damper.

14. The vibration isolation system as recited in claim 12, wherein the vibration isolator comprises a resilient pad disposed between the base machine component and the support structure.

15. The vibration isolation system as recited in claim 14, wherein the resilient pad is a polymer pad having damping characteristics sufficient to reduce the amplitude of vibrations established between the base and operator machine components.

16. A vibration isolation system including a machine cooperating with a vibration isolator configured to isolate the machine from its support structure and to thereby raise the natural frequency within the machine, comprising:

a base machine component configured to hold an object, an operator machine component configured to hold an operator for interaction with the object, wherein the ratio of the mass of the operator machine component to the mass of the base machine component is in the range from approximately 0.5 to 2.0;

an actuator mechanism connected between the base machine component and the operator machine component to move the operator machine component with respect to the base machine component;

a vibration isolator connected between the machine and its support structure to raise the natural frequency of the actuator mechanism acting between the base machine component and the operator machine component by a factor of at least 1.20;

the vibration isolator including a material having spring characteristics effective to decouple the machine from its support structure, the material comprising a resilient pad disposed between the base machine component and the support structure the resilient pad being a polymer pad having damping characteristics sufficient to reduce the amplitude of vibrations established between the base and operator machine components;

wherein the base machine component includes a plurality of legs and the polymer pad is split into sections, further wherein at least two sections are disposed between each leg and the support structure, the sections being oriented at an angle to receive vibrational forces substantially in compression.

17. The vibration isolation system as recited in claim 14, wherein the ratio of the mass of the operator machine component to the mass of the base machine component is in the range from approximately 0.9 to 1.1.

18. The vibration isolation system as recited in claim 14, wherein the actuator mechanism includes at least six extensible legs.

19. A method for raising the natural frequency of a machine tool supported on a support structure and for raising the maximum relative acceleration of one machine tool platform with respect to the other machine tool platform, the machine tool being configured to rigidly hold a workpiece relative to one of the platforms and to hold a tool with respect to the other platform, the platforms being connected by an actuator mechanism capable of moving the platforms with respect to each other, comprising the steps of:

forming a pair of platforms for supporting the workpiece and the tool, respectively;

establishing the mass of each platform so the ratio of the mass of one platform to the mass of the other is in the range from 0.5 to 2.0; and separating the pair of platforms from the support structure by a vibration isolation device.

20. The method of claim 19 for raising the natural frequency of a machine tool and for raising the maximum relative acceleration of one machine tool platform with respect to the other, wherein the step of separating includes the steps of:

connecting the pair of platforms to the floor by a material having spring characteristics; and connecting the pair of platforms to the floor by a material having damping characteristics.

21. The method of claim 20 for raising the natural frequency of a machine tool and for raising the maximum acceleration of one machine tool platform with respect to the other, further comprising the step of combining the spring material and the damping material into a single material.

* * * * *